US006848329B2

(12) United States Patent  
Okada et al.

(10) Patent No.: US 6,848,329 B2
(45) Date of Patent: Feb. 1, 2005

(54) AUTOMATIC TRANSMISSION AND VEHICLE

(75) Inventors: Takashi Okada, Hitachi (JP); Toshimichi Minowa, Mito (JP); Mitsuo Kayano, Hitachi (JP); Tatsuya Ochi, Hitachi (JP); Hiroshi Sakamoto, Hitachi (JP); Hiroshi Kuroiwa, Hitachi (JP); Naoyuki Ozaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 24 days.

(21) Appl. No.: 09/986,070

(22) Filed: Nov. 7, 2001

(65) Prior Publication Data

US 2002/0053247 A1 May 9, 2002

(30) Foreign Application Priority Data

Nov. 8, 2000 (JP) .......................... 2000-345459
Feb. 2, 2001 (JP) .......................... 2001-026586

(51) Int. Cl.$^7$ ................................. F16H 3/12
(52) U.S. Cl. ........................... 74/339; 74/325
(58) Field of Search ..................... 74/325, 331, 333, 74/339, 359; 180/65.3, 65.7

(56) References Cited

U.S. PATENT DOCUMENTS 4,627,312 A * 12/1986 Fujieda et al. ............. 477/124
4,860,607 A * 8/1989 Numazawa et al. ......... 74/330
5,313,856 A * 5/1994 Schneider et al. .......... 477/80
6,514,172 B2 * 2/2003 Kayano et al. ............. 477/110
6,514,173 B2 * 2/2003 Suzuki ...................... 477/124
6,550,352 B2 * 4/2003 Okada et al. ............... 74/335
6,561,052 B2 * 5/2003 Kayano et al. ............. 74/339
2001/0013258 A1 * 8/2001 Kobayashi .................. 74/359

FOREIGN PATENT DOCUMENTS

JP      2000-65199      3/2000

* cited by examiner

*Primary Examiner*—Sherry Estremsky
(74) *Attorney, Agent, or Firm*—Crowell & Moring LLP

(57) ABSTRACT

An automatic transmission has a first axis (input axis) 102 for inputting the power, a second axis (output axis or couner axis) 103 for outputting the driving force source, at least one or more first gear group which consists of drive gears 111, 112 fixed on the first axis, and a driven gear 122 provided so as to engage or run idle with respect to the second axis with being engaged with the drive gear, and at least one or more second gear group which consists of driven gears 123, 124, 125 fixed on the second axis, and a drive gear 114, 115 provided so as to engage or run idle with respect to the first axis with being engaged with the driven gear. The automatic transmission further comprises a torque transferring mechanism 140 for transfering the torque between said driven gear which can run idle with respect to the second axis and the driven gear fixed to the second axis.

58 Claims, 23 Drawing Sheets

NORMAL RUNNING

TORQUE ASSIST / REGENERATION

ENGINE START / IDLE CHARGE

FIG. 15
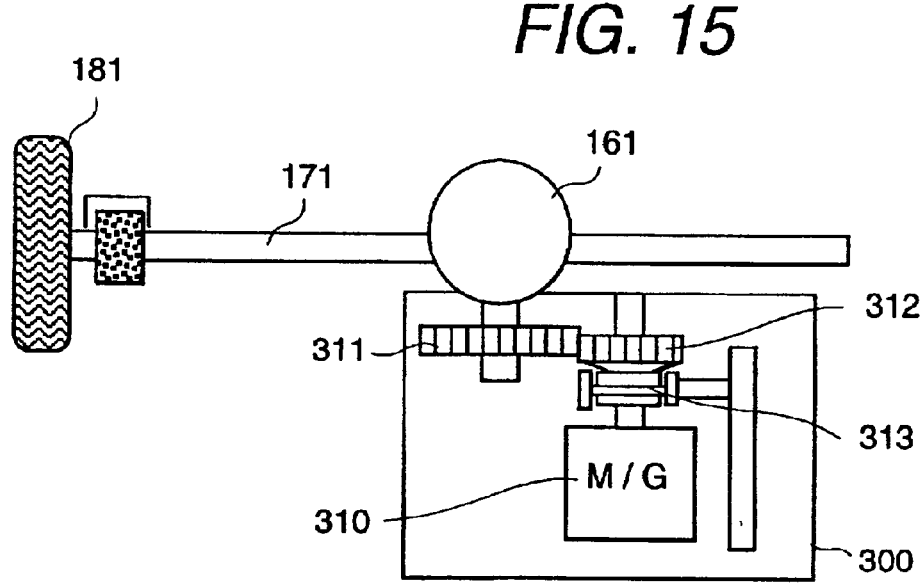
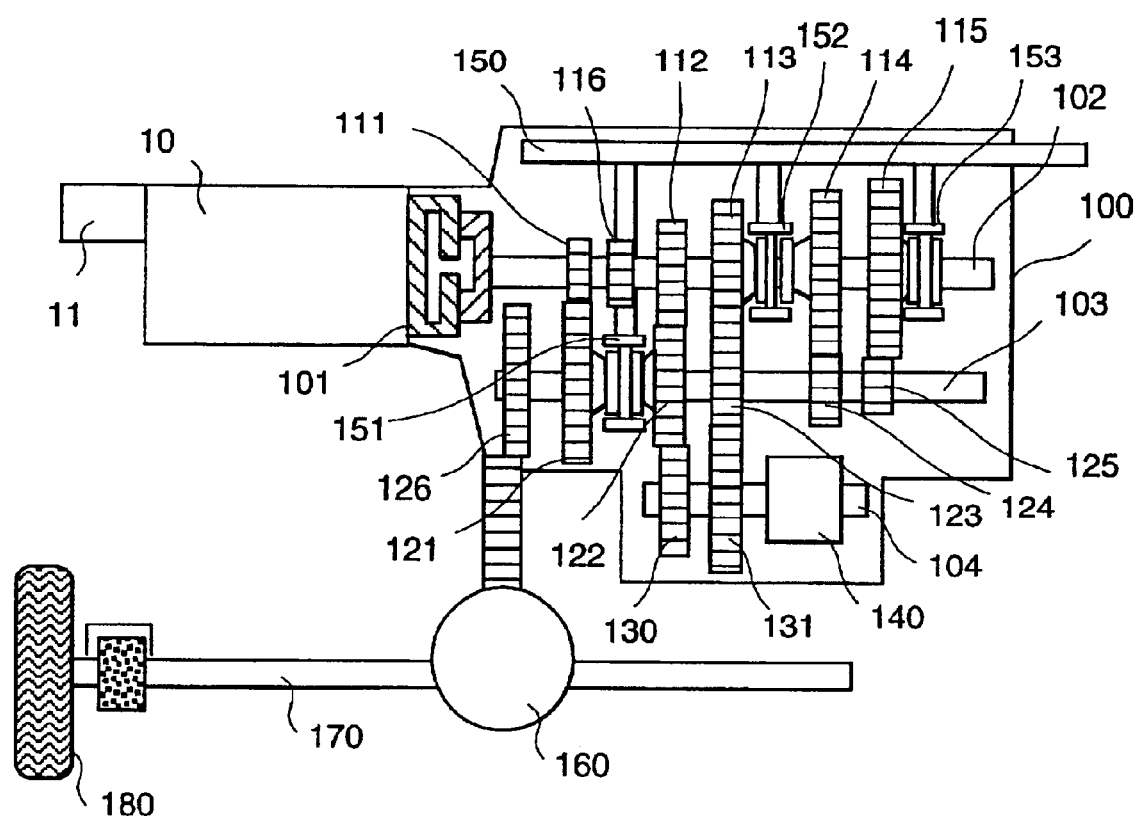

FIG. 19
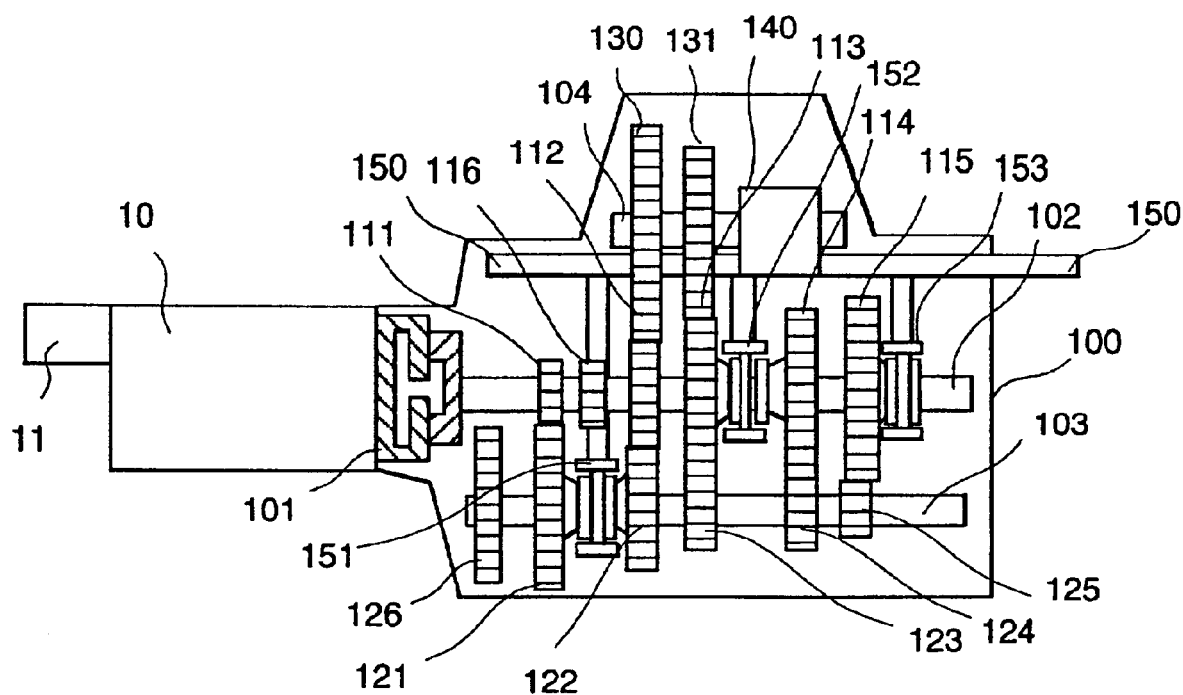
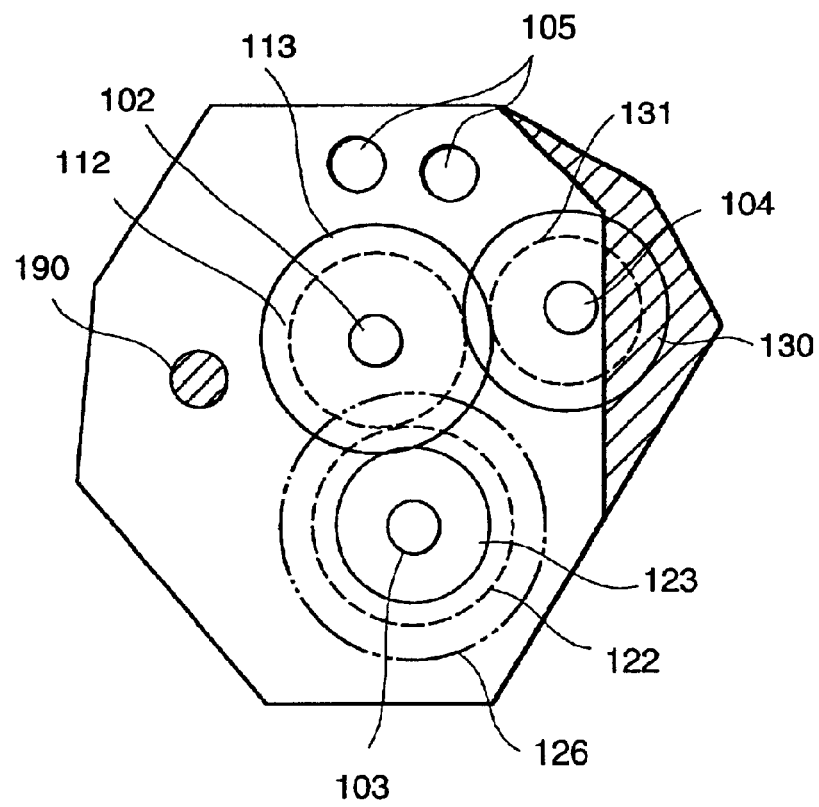

AUTOMATIC TRANSMISSION AND VEHICLE

BACKGROUND OF THE INVENTION

The present invention relates to an automatic transmission and a vehicle.

The automatic transmission by which the shifting is automatically executed by using the mechanism of conventional manual transmission, that is, mesh type transmission is known. This transmission is provided with a clutch which is a torque transferring mechanism for engaging or disengaging the engine (Hereafter, referred to an engine, but power sources other than the engine are included) which is a power source and the transmission, and an actuator for operating a torque transferring mechanism (Hereafter, it is occasionally called a clutch or a mesh type clutch) for engaging or disengaging each gear and a first axis (Hereafter, it is called an input shaft) or a second axis (Hereafter, it is called an output shaft or a counter axis). The oil pressure supplied to actuator is controlled to execute the engagement and the disengagement of the torque transferring mechanism (clutch), and automatic shifting is executed. In the conventional automatic transmission like this, there is a so-called neutral state in which any gears are not engaged with the axis by the torque transferring mechanism (clutch).

Such a neutral state is a state that any gears are not engaged with the axis by the clutch when the up shift is carried out, in which the shifting is performed by moving the gear position of a certain gear ratio to the gear position of another high gear ratio. Therefore, the power of acceleration is not transferred to the output shaft, although the vehicle is in an accelerated state. As a result, a kind of shock feeling or the deceleration feeling is given to the driver, and there is a problem with a bad drive sense. The mechanism to improve this respect is disclosed in the Japanese Patent Application Laid-Open No. 2000-65199.

In this mechanism, the torque transferring mechanism with the gear of the top gear ratio for transferring the torque to the first axis (It is an axis for inputting the power, and, hereafter, it is called an input shaft) and the second axis (It is an axis for outputting the power, and, hereafter, it is called an output shaft or a counter axis) is changed from the mesh type clutch to the friction type clutch. The torque is transferred by the friction clutch slided while shifting.

In order to prevent the torque interruption like this, the configuration of the torque transferring mechanism (clutch) for engaging or disengaging between the the gear of the top gear stage and the axis is required to change from the mesh type clutch to the friction type clutch. In this case, the size of the friction type clutch becomes more than that of the mesh type clutches used so far.

Therefore, it is necessary to enlarge the size of the transmission especially for the FF (Front wheel Front drive) vehicle in which the engine and the transmission is arranged at a front position (between front wheels) of a car when thinking about the transmission of the car. Therefore, there is a problem that such a clutch cannot be provided in the arrangement structure of the transmission of the conventional car. Further, it is thought similarly for the transmission of a small FR (Front engine Rear drive) car. In addition, it is necessary to change the parts of the gear and the clutch of the present mesh type transmission, and thus remodel the former transmission.

An object of the present invention is to provide an improved automatic transmission, in which it is possible to install in a state in which the change in size of the transmission can be suppressed to the minimum, the mechanism of the present transmission is not changed, and the present transmission can be used as it is by adding some components later, when the mechanism by which the shock feeling at engagement and the disengagement of the clutch can be softened at the time of the shifting is provided in the conventional small gear type transmission.

Further, another object of the present invention is to provide a vehicle that rides easily when shifting by achieving small gear type transmission which provides the mechanism by which the shock feeling at the clutch engagement and disengagement can be softened when shifting.

(1) To achieve the above-mentioned object, the present invention adopts the following configuration. Namely, an automatic transmission comprises: a first axis for inputting the power, a second axis for outputting the driving force source, at least one or more first gear group which consists of a drive gear fixed on said first axis, and a driven gear provided so as to engage or run idle with respect to said second axis with being engaged with said drive gear, and at least one or more second gear group which consists of a driven gear fixed on said second axis, and a drive gear provided so as to engage or run idle with respect to said first axis with being engaged with said driven gear, further comprising a torque transferring mechanism for transferring the torque between said driven gear which can run idle with respect to said second axis and said driven gear fixed to said second axis.

According to such a configuration, it becomes possible to provide an improved automatic transmission, in which it is possible to install in a state in which the change in size of the transmission can be suppressed to the minimum, the mechanism of the present transmission is not changed, and the present transmission can be used as it is.

(2) Further, to achieve the above-mentioned object, the present invention adopts the following configuration. Namely, an automatic transmission comprising: a first axis for inputting the power, a second axis for outputting the driving force source, at least one or more first gear group which consists of a drive gear fixed on said first axis, and a driven gear provided so as to engage or run idle with respect to said second axis with being engaged with said drive gear, and at least one or more second gear group which consists of a drive gear fixed on said second axis, and a driven gear provided so as to engage or run idle with respect to said first axis with being engaged with said drive gear, further comprising a torque transferring mechanism provided between said first gear group and said second gear group, and wherein the torque is transferred from said 1st axis to said 2nd axis with this torque transferring mechanism.

According to such a configuration, it becomes possible to provide an improved automatic transmission, in which it is possible to install in a state in which the change in size of the transmission can be suppressed to the minimum, the mechanism of the present transmission is not changed, and the present transmission can be used as it is.

(3) Further, to achieve the above-mentioned object, the present invention adopts the following configurations. Namely, an automatic transmission comprising: a first axis for inputting the power, a second axis for outputting the driving force source, at least one or more first gear group which consists of a drive gear fixed on said first axis, and a driven gear provided so as to engage or run idle with respect to said second axis with being engaged with said drive gear, and at least one or more second gear group which consists of a drive gear fixed on said second axis, and a driven gear provided so as to engage or run idle with respect to said first axis with being engaged with said drive gear, further comprising a torque transferring mechanism provided between said first gear group and said second gear group, and wherein the torque is transferred from said 1st axis to said 2nd axis with this torque transferring mechanism while shifting.

According to such a configuration, it becomes possible to provide an improved automatic transmission, in which it is possible to install in a state in which the change in size of the transmission can be suppressed to the minimum, the mechanism of the present transmission is not changed, and the present transmission can be used as it is.

(4) In an automatic transmission according to any one of items 1, 2 and 3, preferably said torque transferring mechanism comprises: a first gear engaged with said driven gear which can run idle with respect to said second axis, a second gear engaged with said driven gear fixed to said second axis, and a torque transferring means for transferring the torque between said first gear and said second gear.

(5) In an automatic transmission according to item 4, preferably the first gear engaged with said driven gear which can run idle with respect to said second axis, the second gear engaged with said driven gear fixed to said second axis, and the torque transferring means for transferring the torque between said first gear and said second gear in said torque transferring mechanism, are provided on another axis different from said first axis and said second axis.

(6) In an automatic transmission according to any one of items 1 to 5, preferably the torque ratio transferred from said 1st axis to said 2nd axis by said 1st gear group, said torque transferring mechanism and said 2nd gear group is one or more.

(7) In an automatic transmission according to any one of items 1 to 6, preferably the gear engaged with one of said drive gears fixed to said first axis is provided on another axis different from said first axis and said second axis, further comprising a motor generator for driving and regenerating, and a torque transferring mechanism for adjusting the torque transfer between said gear and said motor generator.

(8) In an automatic transmission according to any one of items 1, 2 and 3, preferably said torque transferring mechanism comprises a friction type clutch.

(9) In an automatic transmission according to item 8, preferably the lubricant for said friction clutch is provided independently of the lubricant for said transmission.

(10) In an automatic transmission according to item 7, preferably the motor engaged with said transmission is started by said motor generator.

(11) In an automatic transmission according to item 7, preferably the driving force source of said motor generator is transferred to said second axis while shifting.

(12) In an automatic transmission according to any one of items 1 to 10, preferably the automatic transmission further includes a motor generator for generating the driving force source and regenerating the torque, and a transferring mechanism provided between wheels to which the torque of said transmission is not transferred and the motor generator, for transferring and interrupting the torque.

(13) In an automatic transmission according to item 12, preferably the torque generated by said motor generator is transferred to said wheels by said transferring mechanism while shifting, and the torque is added to said wheel.

(14) Further, to achieve the above-mentioned object, the present invention adopts the following configurations. Namely, an automatic transmission includes: a first axis for inputting the power, a second axis for outputting the driving force source, at least one or more first gear group which consists of a drive gear fixed on said first axis, and a driven gear provided so as to engage or run idle with respect to said second axis with being engaged with said drive gear, and at least one or more second gear group which consists of a drive gear fixed on said second axis, and a driven gear provided so as to engage or run idle with respect to said first axis with being engaged with said drive gear, further including a torque transferring mechanism for transferring the torque between said drive gear which can run idle with respect to said first axis and said drive gear fixed to said first axis.

According to such a configuration, it becomes possible to provide an improved automatic transmission, in which it is possible to install in a state in which the change in size of the transmission can be suppressed to the minimum, the mechanism of the present transmission is not changed, and the present transmission can be used as it is.

(15) Further, to achieve the above-mentioned object, the present invention adopts the following configurations. Namely, an automatic transmission includes: a first axis for inputting the power, a second axis for outputting the driving force source, at least one or more first gear group which consists of a drive gear fixed on said first axis, and a driven gear provided so as to engage or run idle with respect to said second axis with being engaged with said drive gear, at least one or more second gear group which consists of a drive gear fixed on said second axis, and a driven gear provided so as to engage or run idle with respect to said first axis with being engaged with said drive gear, further including a first gear engaged with said driven gear which can run idle with respect to said first axis, a second gear engaged with said drive gear fixed to said first axis, and a torque transferring means for transferring the torque between said first gear and said second gear.

According to such a configuration, it becomes possible to provide an improved automatic transmission, in which it is possible to install in a state in which the change in size of the transmission can be suppressed to the minimum, the mechanism of the present transmission is not changed, and the present transmission can be used as it is.

(16) Further, to achieve the above-mentioned object, the present invention adopts the following configurations. Namely, an automatic transmission includes: a first axis for inputting the power, a second axis for outputting the driving force source, at least one or more first gear group which consists of a drive gear fixed on said first axis, and a driven gear provided so as to engage or run idle with respect to said second axis with being engaged with said drive gear, at least one or more second gear group which consists of a drive gear fixed on said second axis, and a driven gear provided so as to engage or run idle with respect to said first axis with being engaged with said drive gear, further including a first gear engaged with said drive gear which can run idle with respect to said second axis, a second gear engaged with said driven gear fixed to said second axis, and a torque transferring means for transferring the torque between said first gear and said second gear in said torque transferring mechanism, wherein the first gear, the second gear and the torque transferring means are provided on another axis different from said first axis and said second axis.

According to such a configuration, it becomes possible to provide an improved automatic transmission, in which it is possible to install in a state in which the change in size of the transmission can be suppressed to the minimum, the mechanism of the present transmission is not changed, and the present transmission can be used as it is.

(17) Further, to achieve the above-mentioned object, the present invention adopts the following configurations. Namely, an automatic transmission includes: a first axis for inputting the power, a second axis for outputting the driving force source, at least one or more first gear group which consists of a drive gear fixed on said first axis, and a driven gear provided so as to engage or run idle with respect to said second axis with being engaged with said drive gear, and at least one or more second gear group which consists of a drive gear fixed on said second axis, and a driven gear provided so as to engage or run idle with respect to said first axis with being engaged with said drive gear, further including a torque transferring mechanism for transferring the torque between said driven gear which can run idle with respect to said second axis and said driven gear fixed to said second axis, wherein when said driven gear of said first gear group runs idle, the torque is transferred from said first axis to said second axis through a driven gear which runs idle with respect to said drive gear of said first gear group, said torque transferring mechanism, and a driven gear of said second gear group, and when said driven gear of said first gear group is engaged to the second axis, the torque is transferred from said first axis to said second axis through the driven gear engaged to said drive gear of said first gear group.

According to such a configuration, it becomes possible to provide an improved automatic transmission, in which it is possible to install in a state in which the change in size of the transmission can be suppressed to the minimum, the mechanism of the present transmission is not changed, and the present transmission can be used as it is.

(18) Further, to achieve the above-mentioned object, the present invention adopts the following configurations. Namely, a vehicle which installs automatic transmission includes: a first axis for inputting the power, a second axis for outputting the driving force source, at least one or more first gear group which consists of a drive gear fixed on said first axis, and a driven gear provided so as to engage or run idle with respect to said second axis with being engaged with said drive gear, and at least one or more second gear group which consists of a drive gear fixed on said second axis, and a driven gear provided so as to engage or run idle with respect to said first axis with being engaged with said drive gear, wherein the shifting is done by switching from the torque transfer from said 1st axis to said 2nd axis by said 1st gear group or said 2nd gear group to the torque transfer from said 1st axis to said 2nd axis by another said 1st gear group or another said 2nd gear group different from said 1st gear group or said 2nd gear group, further including a torque transferring mechanism provided between one of said first gear groups and one of said said second gear groups in said transmission, and a shifting control means for transferring the torque from said 1st axis to said 2nd axis by said torque transferring mechanism while shifting, wherein the amount of the back and forth accelaration change generated in said vehicle while shifting is controlled by said shift control means so as to fall within 1.0 m/s².

According to such a configuration, it becomes possible to provide a vehicle that rides easily when shifting by achieving small gear type transmission which provides the mechanism by which the shock feeling at the clutch engagement and disengagement can be softened when shifting.

(19) A vehicle according to item 18, wherein the back and forth accelaration generated in said vehicle while shifting is controlled by said shift control means so as to become more than 0.0 m/s².

(20) Further, to achieve the above-mentioned object, the present invention adopts the following configurations. Namely, a vehicle which installs an automatic transmission includes: a first axis for inputting the power, a second axis for outputting the driving force source, at least one or more first gear group which consists of a drive gear fixed on said first axis, and a driven gear provided so as to engage or run idle with respect to said second axis with being engaged with said drive gear, at least one or more second gear group which consists of a drive gear fixed on said second axis, and a driven gear provided so as to engage or run idle with respect to said first axis with being engaged with said drive gear, wherein the shifting is done by switching from the torque transfer from said 1st axis to said 2nd axis by said 1st gear group or said 2nd gear group to the torque transfer from said 1st axis to said 2nd axis by another said 1st gear group or another said 2nd gear group different from said 1st gear group or said 2nd gear group, further including a torque transferring mechanism provided between one of said first gear groups and one of said said second gear groups in said transmission, and a control means for controlling the shifting by selecting a shifting system in which the torque transfer from said 1st axis to said 2nd axis is performed by said torque transferring mechanism while shifting or a shifting system in which said torque transferring mechanism is not used, wherein the amount of the back and forth accelaration change generated in said vehicle while shifting is controlled by said control means so as to fall within 1.0 m/s².

According to such a configuration, it becomes possible to provide a vehicle that rides easily when shifting by achieving small gear type transmission which provides the mechanism by which the shock feeling at the clutch engagement and disengagement can be softened when shifting.

(21) In a vehicle according to item 20, the vehicle further includes a motor which generates the power introduced into said first axis, wherein the torque is transferred from said 1st axis to said 2nd axis by said torque transferring mechanism while shifting when the torque generated by said motor is more than a fixed value, and otherwise, the torque is not transferred from said 1st axis to said 2nd axis by said torque transferring mechanism while shifting.

(22) In a vehicle according to item 20, the vehicle includes a motor which generates the power introduced into said first axis, wherein the torque is transferred from said 1st axis to said 2nd axis by said torque transferring mechanism while shifting when the throttle valve opening for adjusting the torque generated by said motor is more than a fixed value, and otherwise, the torque is not transferred from said 1st axis to said 2nd axis by said torque transferring mechanism while shifting.

BRIEF DESCRIPTION OF THE DRAWINGS

FIG. 15 is a view showing the whole configuration of the automatic transmission according to a fourth embodiment of the present invention, in which the 4WD is achieved by using an automatic transmission and a motor generator shown in FIG. 1.

FIG. 19 is a view showing the whole configuration of the automatic transmission according to a sixth embodiment of the present invention.

DETAILED DESCRIPTION OF THE PREFERRED EMBODIMENTS

Hereafter, the configuration of the automatic transmission according to a first embodiment of the present invention will be explained with reference to FIG. 1–FIG. 7.

Figure 1:
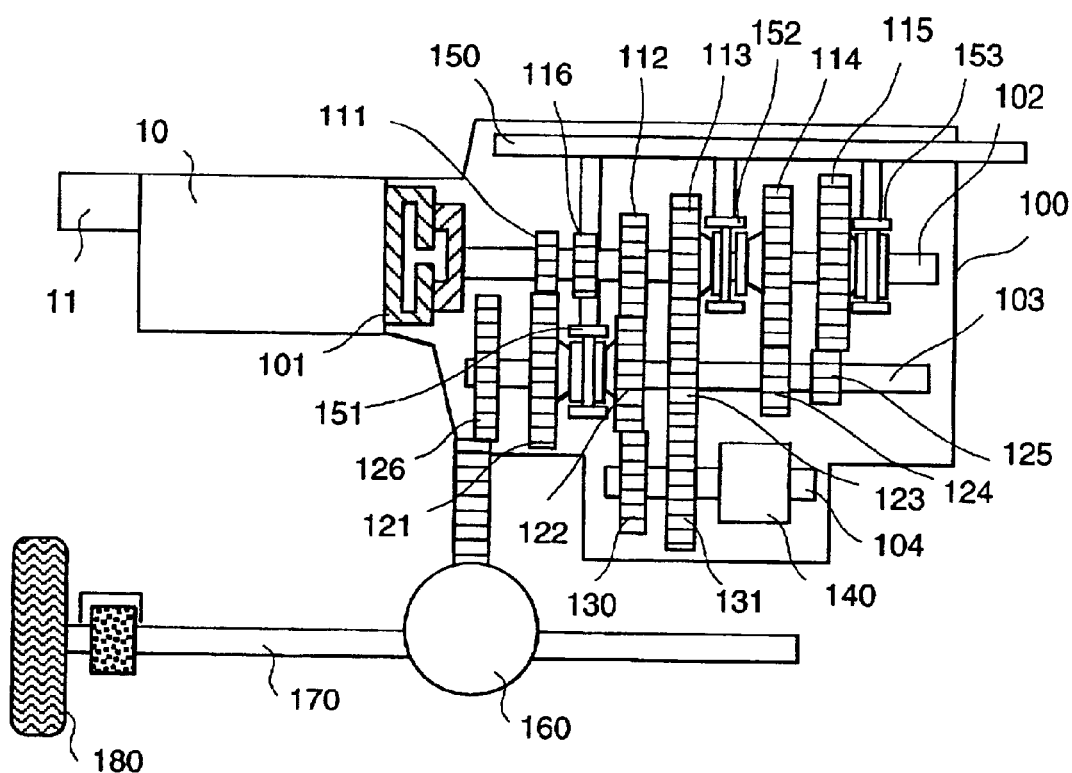
FIG. 1 is a view showing the whole configuration of the automatic transmission according to a first embodiment of the present invention.
Figure 3:
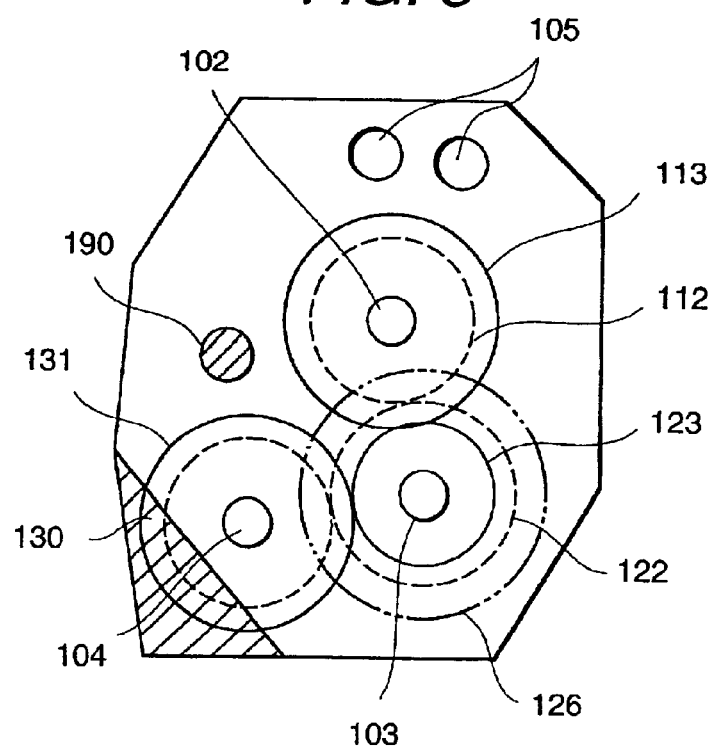
FIG. 3 is a right side view of the automatic transmission shown in FIG. 1.
Figure 2:
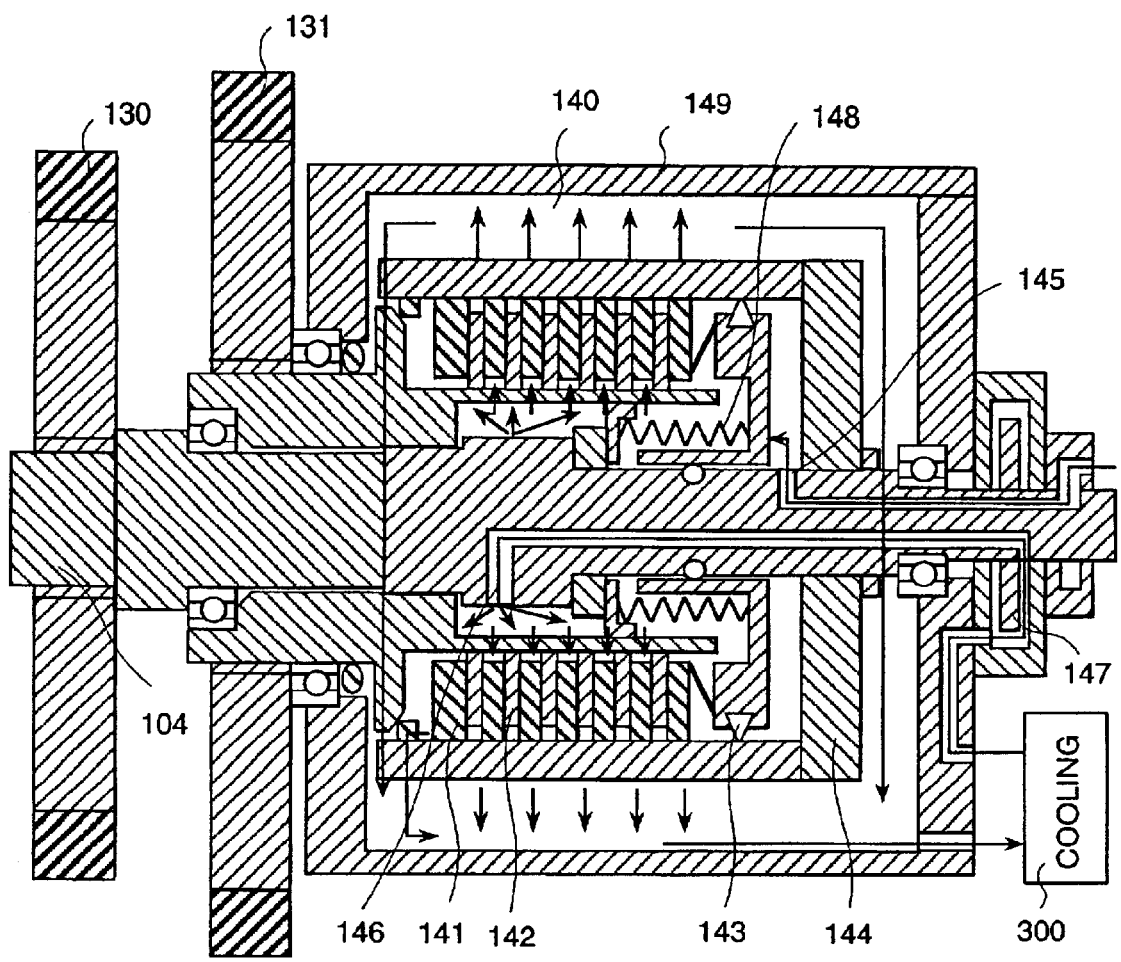
FIG. 2 is a enlarged view of the assist mechanism shown in FIG. 1.
Figure 4:
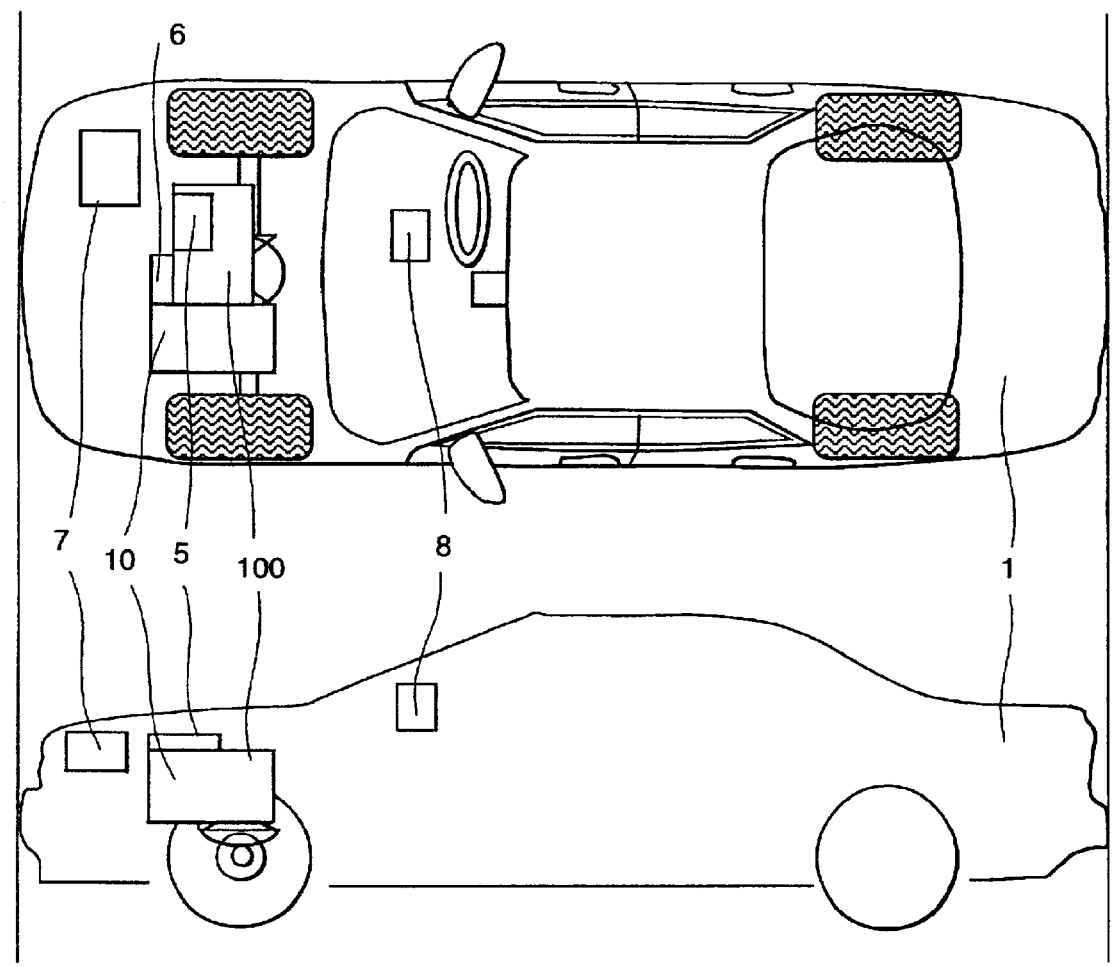
FIG. 4 is a view showing the position where the automatic transmission according to this embodiment is arranged in the body of a car.
Figure 5:
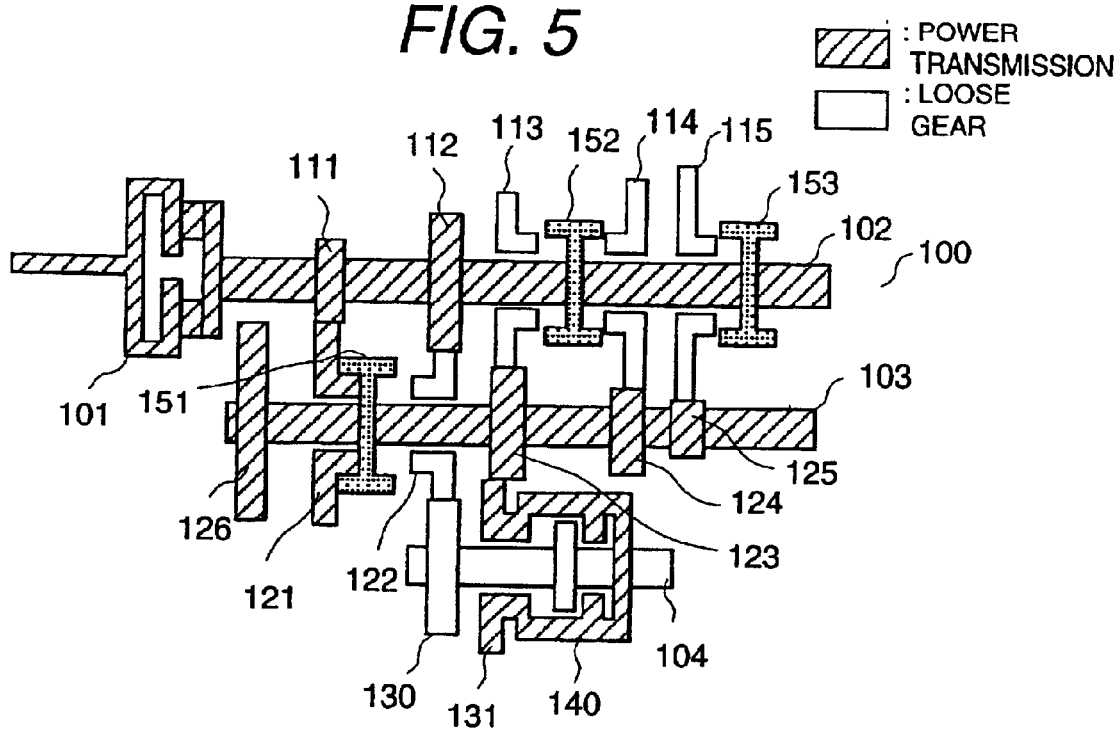
FIG. 5 is an illustration of the operation of the engagement and the disengagement of the assist mechanism when shifting.
Figure 6:
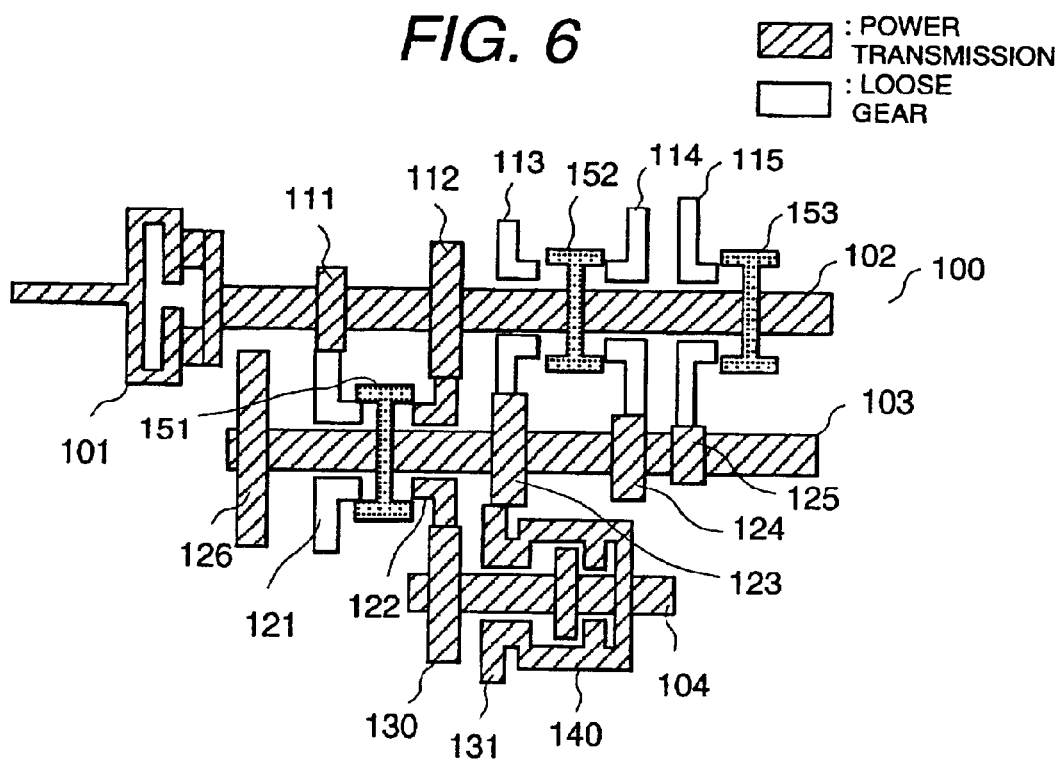
FIG. 6 is an illustration of the operation of the engagement and the disengagement of the assist mechanism when shifting.
Figure 7:
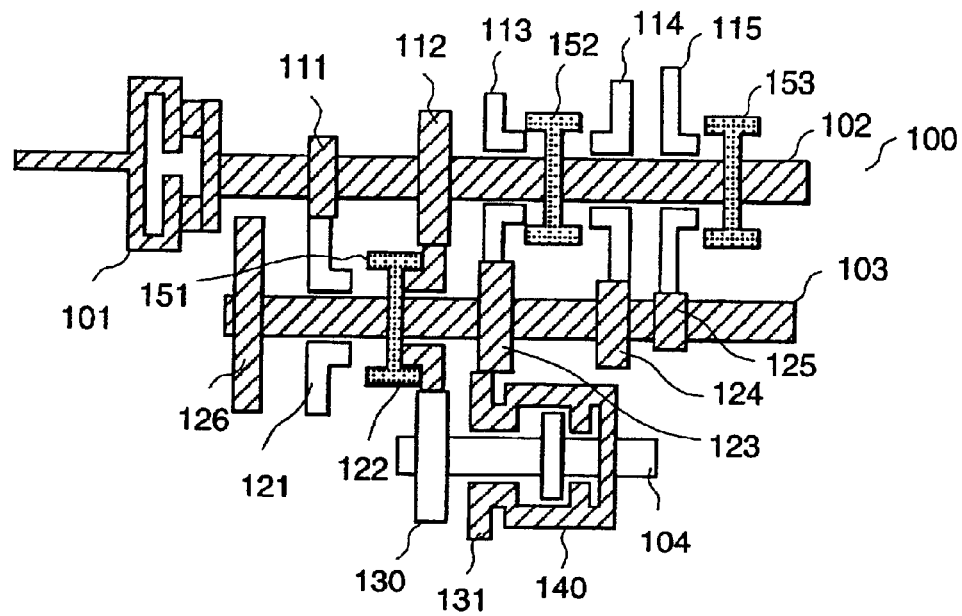
FIG. 7 is an illustration of the operation of the engagement and the disengagement of the assist mechanism when shifting.

FIG. 1 is a view showing the whole configuration of the automatic transmission according to a first embodiment of the present invention. FIG. 2 is a enlarged view of the assist mechanism shown in FIG. 1. FIG. 3 is a right side view of the automatic transmission shown in FIG. 1. FIG. 4 is a view showing the position where the automatic transmission according to this embodiment is arranged in the body of a car. FIGS. 5–7 is an illustration of the operation of the engagement and the disengagement of the assist mechanism when shifting.

In FIG. 1, automatic transmission 100 is housed in the gearbox casing. The first axis 102 (Hereafter, it is called input shaft 102) which rotates by the engagement of torque transferring mechanism 101 (Hereafter, it is called clutch 101) which performs the torque transfer between driving force source 10 (Hereafter, it is called engine 10) and automatic transmission 100 is supported free-rotatably.

Further, the second axis 103 (Hereafter, it is called counter axis 103) is supported free-rotatably in parallel under this input shaft 102.

The 1st drive gear 111, 2nd drive gear 112, 3rd drive gear 113, 4th drive gear 114, 5th drive gear 115 and reverse gear 116 are arranged on input shaft 102. Where, the 1st drive gear 111 and 2nd drive gear 112 are fixed on input shaft 102. The 3rd drive gear 113, 4th drive gear 114, and 5th drive gear 115 are supported free-rotatably with respect to input shaft 102.

Further, 1st driven gear 121, 2nd driven gear 122, 3rd driven gear 123, 4th driven gear 124, and 5th driven gear 125 are arrange on the second axes 103 (Hereafter, it is called counter axis 103). The 1st driven gear 121 and the 2nd driven gear 122 are supported free-rotatably with respect to counter axis 103. Those driven gears engage respectively with 1st drive gear 111 and 2nd drive gear 112 of input shaft 102. Further, 3rd driven gear 123, 4th driven gear 124, and 5th driven gear 125 are fixed on counter axis 103. Those driven gears engage respectively with 3rd drive gear 113, 4th drive gear 114, and 5th drive gear 115 of input shaft 102.

With regard to this input shaft, mesh type clutch 152 is provided 102 as a torque transferring mechanism between 3rd drive gear 113 and 4th drive gear 114. This mesh type clutch 152 is engaged with input shaft 102, and rotates along with input shaft 10. This mesh type clutch 152 engages with input shaft 102, and can slide on input shaft 102. Input shaft 102 is engaged with mesh type clutch 152 and 3rd drive gear 113 by shifting mesh type clutch 152 to the left of FIG. 1. As a result, the rotation of input shaft 102 is transferred to counter axis 103 through 3rd driven gear 123. Further, mesh type clutch 152 and 4th drive gear 114 are engaged by shifting mesh type clutch 152 to the right of FIG. 1. As a result, the rotation of input shaft 102 is transferred to counter axis 103 through 4th driven gear 124. (Here, the mesh type clutch is a torque transfer means for engaging or disengaging a free gear and a free axis for the rotation, and, in the following, it is called the mesh type clutch. However, another means may be similarly applicable). Similarly, mesh type clutch 153 is provided on 5th drive gear 115. This mesh type clutch 153 is engaged with input shaft 102, and rotates along with input shaft 102. This mesh type clutch 153 that is can engage with input shaft 102, and slide on it. Mesh type clutch 153 and 5th drive gear 115 are engaged by shifting mesh type clutch 153 to the left of FIG. 1. As a result, the rotation of input shaft 102 is transferred to counter axis 103 through 5th driven gear 125.

With regard to the counter axis, mesh type clutch 151 is provided between 1st driven gear 121 and 2nd driven gear 122. This mesh type clutch 151 is engaged with counter axis 103, and rotates along with counter axis 103. This mesh type clutch 151 can engage with counter axis 103, and slide on it. Mesh type clutch 153 and 1st driven gear 121 are engaged by shifting mesh type clutch 151 to the left of FIG. 1. The rotation of input shaft 102 is transferred to counter axis 103 through 1st drive gear 111 fixed to input shaft 102. Mesh type clutch 151 and 2nd driven gear 122 are engaged by shifting mesh type clutch 151 to the right of FIG. 1. The rotation of input shaft 102 is transferred to counter axis 103 through 2nd drive gear 112 fixed to input shaft 102. Although the 5-speed transmission has been adopted,it is similarly applicable for 4-speed transmission or 6-speed transmission. Further, even when the arrangement of the mesh type clutch is different, it is similarly applicable.

1st drive gear 111 and 2nd drive gear 112 rotate when input shaft 102 rotates from the above description. However, neither 3rd drive gear 113, 4th drive gear 114 nor 5th drive gear 115 synchronize with the rotation of input shaft 102 as long as not engaged by mesh type clutch 152,153. Further, 1st driven gear 121 and 2nd driven gear 122 of counter axis 103 rotate freely as long as not engaged by mesh type clutch 151 of counter axis 103, and the torque of input shaft 102 is not output to counter axis 103.

These mesh type clutch 151–153 are operated by moving shift fork 150 by activating actuator of shift selection mechanism 5. This shift selection mechanism 5 executes the switch operation of the shifting gear ratio selected from the present vehicle speed and the accelerator command value output based on the driver's accelerator pedal position and the shifting gear ratio selected by the shift-up and shift-down demand given by the driver.

Next, another axis 104 (Hereafter, it is called assist axis 104) is provided in the horizontal direction of counter axis 103 (shown downward for convenience' sake in FIG. 1) in parallel with counter axis 103.

The 1st gear 130 (Hereafter, it is called assist input gear 130) and the 2nd gear 131 (Hereafter, it is called assist output gear 131) are provided on this assist axis 104 so as to engage 2nd driven gear 122 of counter axis 103 and 3rd driven gear 123 fixed to and counter axis 103, respectively. Assist input gear 130 and assist output gear 131 operate according to assist mechanism 140 which is the torque transferring mechanism so that the torque can be transferred or not be transferred from assist input gear 130 to assist output gear 131 or from assist output gear 131 to from assist input gear 130. In a word, assist mechanism 140 is a torque transferring mechanism which can transfer or interrupt the torque between the gear provided free-rotatably on counter axis 103 and the gear fixed to counter axis 103.

FIG. 2 is an enlarged view showing one of embodiments concerning assist axis 104 and assist mechanism 140. Assist axis 104 and assist mechanism 140 which is one of embodiments will be explained in detail with reference to FIG. 2. In the embodiment shown in FIG. 2, assist input gear 130 is fixed to assist axis 104. The rotation driving force generated by engine 10 is transferred from 2nd drive gear 112 fixed to input shaft 102 to assist input gear 130 via 2nd driven gear 122 provided free-rotatably on counter axis 103. The rotation driving force transferred from assist input gear 130 is transferred to assist output gear 131 through assist mechanism 140. Here, in one embodiment of assist mechanism 140, two or more drive plates 141 fixed to assist axis 104 and driven plate 142 fixed to the same axis as assist output gears 131 are alternately arranged as shown in FIG. 2. Special oil exists in casing 149 of assist mechanism 140, and also between drive plate 141 and driven plate 142. Here, the oil which exists between drive plate 141 and driven plate 142 is one to keep the friction between drive plate 141 and driven plate 142 to be constant. This oil is dispersed by rotating assist axis 104, and collected in casing 149 at the end. The oil collected in the bottom of casing 149 is taken out of casing 149 outside via a strainer (not shown), and cooled by cooling mechanism 300. After then, the oil is thrown into a channel in the axis of assist axis 104 again via the channel in casing 149 by oil pump 147 provided on assist axis 104. After then, the oil is given from lubricant input port 146 provided on assist axis 104 to clutch drum 144 by the torque, and circulated to drive plate 141 and driven plate 142. As a result, because the lubrication in assist mechanism 140 is carried out independently, the stable characteristic can be obtained.

Piston mechanism 143 by which drive plate 141 and driven plate 142 are pressed is provided in assist mechanism 140. Piston 143 is pushed by the oil pressure of the oil injected from the piston working liquid inputport 145 provided on assist axis 104, and thus drive plate 141 and driven plate 142 are pressed. The torque capacity transferred between drive plate 141 and driven plate 142 by the pressing power of this piston 143 is decided, and drive plate 141 and driven plate 142 transfer the torque while mutually sliding. In a word, the torque is transferred between assist input gear 130 and assist output gear 131 by putting pressure on piston 143, and The torque transferred between assist input gear 130 and assist output gear 131 can be adjusted by adjusting the pressure pressing piston 143 at this time. Further, piston 143 is returned by the force of return spring 148 by losing the pressing pressure to piston 143. As a result, assist output gear 131 comes free-rotatably, because drive plate 141 and driven plate 142 are disengaged and the torque transferred between assist input gear 130 and assist output gear 131 becomes zero.

As a result, the rotation driving torque from engine 10 can be transferred to counter axis 103 by adjusting the pressure to piston 143 of assist mechanism 140. In a word, driven plate 142 always rotates with the rotation of counter axis 103 by assist output gear 131 and 3rd driven gear 123 fixed to counter axis 103 in this assist mechanism 140 as shown in FIG. 5. Therefore, the torque from engine 10 is transferred from the 2nd drive gear 112 fixed to input shaft 102 through 2nd driven gear 122 provided free-rotatably on counter axis 103 and assist input gear 130 fixed to assist axis 104 to assist output gear 131 that is provided free-rotatably on assist axis 104 by putting pressure on piston 143 of assist mechanism 140. In addition, the torque is transferred from input shaft 102 to counter axis 103 by using assist mechanism 140, by transferring the torque to 3rd driven gear 123 fixed to counter axis 103 engaged with assist output gear 131. The torque transferred to counter axis 103 is transferred through final reduction gear 126 fixed to counter axis 103, and then from differential gear 160 for distributing the torque to right and left tires 180 in the front part of the car to drive tires 180 through shaft 170.

Thus, the torque from input shaft 102 is always transferred to assist input gear 130 of assist mechanism 140 through 2nd driven gear 122 provided free-rotatably on counter axis 103. Therefore, it is possible to assist the torque of input shaft 102 to counter axis 103 by operating assist mechanism 140, while the gear engaged at present is released while shifting and the rotation of input shaft 102 is not transferred to counter axis 103 until a new gear is engaged (at neutrality). As a result, the shock feeling caused while the gear which has been engaged is disengaged and a new gear is engaged when shifting can be improved.

In addition, assist mechanism 140 can be put in the transmission without changing the length of input shaft 102 and counter axis 103 by providing assist axis 104 besides input shaft 102 and counter axis 103, and providing assist mechanism 140 on the assist axis 104.

Further, the torque is transferred through driven gear 122 provided free-rotatably on counter axis 103 when the torque of input shaft 102 is transferred to assist input gear 130 of assist mechanism 140. According such a configuration, the addition of the gear for the torque transfer from input shaft 102 to assist mechanism 140 can be made a minimum, and the number of parts can be decreased. Therefore, the part added to the present gear type transmission can be reduced, and the structure of automatic transmission 100 can be miniaturized. Further, it is possible to assemble easily by providing assist mechanism 140 on independent assist axis 104.

Although assist input gear 130 of assist mechanism 140 is engaged with 2nd driven gear 122 in this embodiment, a driven gear with any gear ratio is acceptable if it can rotate freely with respect to counter axis 103.

Further, the position where assist axis 104 is arranged is set from the relationship of the positions of the gears provided on input shaft 102 and counter axis 103 as shown in FIG. 3. Although assist axis 104 is provided under the left of counter axis 103 in the embodiment of the present invention of FIG. 3, the position of the assist axis is not limited to this position, but by the position relationship to other mechanisms. Further, reverse idle axis 190 on which a reverse idle wheel is arranged under the left of input shaft 102 in the embodiment of FIG. 3. Therefore, assist axis 104 is arranged in consideration of the interference with this reverse idle axis 190. Further, it is also possible to make assist axis 104 and reverse idle axis 190 as the same axis.

In the embodiment of FIG. 3, A shaded portion under the left of the transmission is the increased portion of the conventional transmission. It is possible to install the improved transmission in the present vehicle as it is, because the increased portion is small.

Automatic transmission 100 configured like this is arranged between the front wheel tires of body 1 as well as the engine as shown in FIG. 4. In FIG. 4, reference numeral 10 designates an engine, 100 a transmission, 5 a shift selection mechanism, 6 drive mechanism fo clutch 101, 7 a hydraulic power unit used for shift selection mechanism 5, clutch drive mechanism 6, and assist mechanism 140 and 8 a display unit.

The operation of automatic transmission 100 will be explained next.

First of all, when the range lever is at parking position (P) or the neutral position (N), the starter motor rotates and engine 10 starts when the driver turns on the starting switch. The command of the range lever is received and shift selection mechanism 5 activates the actuator when the driver moves the range lever to drive range position (D) after engine 10 starts. As a result, mesh type clutch 151 engaged with counter axis 103 is shifted to the side of 1st driven gear 121, and is engaged with 1st driven gear 121. The mesh type clutch 151, 1st driven gear 121, and 1st drive gear 111 of input shaft 102 enters the state of engagement by the engagement of this mesh type clutch 151 and 1st driven gear 121.

At this time, the rotation of input shaft 102 is transferred from 1st drive gear 111 to counter axis 103 through 1st driven gear 121. As a result, counter axis 103 rotates, and final reduction gear 126 fixed to this counter axis 103 rotates. Finally, the rotation of final reduction gear 126 is transferred to tires 180, and tires 180 rotate.

The 1st drive gear 111 fixed to input shaft 102 does not rotate because input shaft 102 does not rotate even if mesh type clutch 151 is engaged to 1st driven gear 121 when clutch 101 is in a released state. Therefore, counter axis 103 does not rotate even if 1st driven gear 121 engaged with 1st drive gear 111 is fixed on counter axis 103 by mesh type clutch 151.

After then, clutch 101 is gradually engaged and input shaft 102 begins to rotate when the driver operates the accelerator,. The rotation of this input shaft 102 rotates 1st drive gear 111. As a result, 1st driven gear 121 engaged with counter axis 103 engaged with 1st drive gear 111 by mesh type clutch 151 rotates, and counter axis 103 rotates. The rotation of this counter axis 103 rotates tires 180 through final reduction gear 126.

The engine speed and the vehicle speed increase further when the driver steps on the accelerator further, and the accelerator command value corresponding to the depressed amount of the accelerator is input to the control unit. The demand shifting gear ratio is obtained from the accelerator command value and the vehicle speed. Drive command is output from the control unit to shift selection mechanism 5 when judged the demand ratio is within the area of the 2nd gear ratio. This shift selection mechanism 5 operates the actuator based on the drive command, shifts mesh type clutch 151 engaged with counter axis 103 to the side of the 2nd driven gear 122, and disengages the clutch and 1st driven gear 121. Shift selection mechanism 5 shifts mesh type clutch 151 to the side of the 2nd driven gear 122, and engages the clutch with 2nd driven gear 122. When shifting from 1st driven gear 121 to 2nd driven gear 122, the engagement of the clutch and 1st driven gear 121 is released. When 2nd driven gear 122 is engaged with the clutch; The state of no engagement is temporarily generated in which mesh type clutch 151 is engaged neither with 1st driven gear 121 nor 2nd driven gear 122. Further, the shifting operation from 1st gear to 2nd gear etc. usually is performed in a state in which clutch 101 is disengaged and the torque from engine 10 is not transferred. At this time, the driver never feels the acceleration feeling though the driver depresses the accelerator, and the driver feels the shock when the vehicle temporarily enters the state of the deceleration. Assist mechanism 140 acts with clutch 101 tied to cancel the shock feeling which the driver receives when shifting.

In addition, the rotation of input shaft 102 rotates 2nd driven gear 122 of counter axis 103 through 2nd drive gear 112 with clutch 101 engaged. The engine speed rises and the accelerator command value corresponding to the depressed amount of the accelerator is input to the control unit when the driver tries to depress the accelerator and speed up, when counter axis 103 rotates and the vehicle runs. In the control unit, the gear ratio demanded from the accelerator command value output from the accelerator and the running speed of the vehicle (vehicle speed) is obtained. The drive command is output to shift selection mechanism 5 by the control unit when judged that the target gear ratio is 3rd gear gear ratio, and the actuator is operated. As a result, mesh type clutch 151 engaged with counter axis 103 is shifted, and the engagement of 2nd driven gear 122 and counter axis 103 is released.

At the same time, it is engaged with input shaft 102 and mesh type clutch 152 at the position of no engagement is shifted to the side of 3rd drive gear 113. As a result, mesh type clutch 152 is engaged with 3rd drive gear 113. 3rd driven gear 123 fixed to mesh type clutch 152, 3rd drive gear 113, and counter axis 103 enters the state of engagement by the engagement of this mesh type clutch 152 to 3rd drive gear 113. Therefore, the rotation of input shaft 102 is transferred from 3rd drive gear 113 through 3rd driven gears 123 of counter axis 103, and rotates counter axis 103. Therefore, the final reduction gear fixed to counter axis 103 rotates, tires 180 rotates at high-speed, and the vehicle speed rises.

Here, when shifting from 2nd gear to 3rd gear by disengaging 2nd driven gear 122 and putting 3rd drive gear 113 into an engagement state, the state of no engagement in which 2nd driven gear 122 is not engaged with counter axis 103 and 3rd drive gear is not engaged with input shaft 102 exists temporarily. In this state of no engagement, the state in which the driving output of engine 10, that is, the torque of input shaft 102 is not temporarily transferred to counter axis 103 is generated. Further, the normal shifting is performed in a state in which clutch 101 is disengaged, and the torque of engine 10 is not transferred. Therefore, the driver never feels the acceleration feeling though the driver depresses the accelerator, and the driver feels the shock when the vehicle temporarily enters the state of the deceleration. To soften driver's shock feeling when shifting, Assist mechanism 140 acts with the clutch 101 engaged.

Assist mechanism 140 at the time of the shifting in which the shift gear is changed-over operates as shown in FIG. 5–FIG. 7. In this example, the engagement with counter axis 103 is switched from 1st driven gear 121 to 2nd driven gear 122 by mesh type clutch 151 of counter axis 103 being switched when shifting from 1st gear to 2nd gear. The route through which the rotating torque of input shaft 102 is transferred to counter axis 103 is changed-over by the switching.

FIG. 5 shows the state in which mesh type clutch 151 is shifted to the side of 1st driven gear 121 and is engaged with 1st driven gear 121.

The rotation of engine 10 is transformed to input shaft 102 because clutch 101 is in a state of the engagement. Therefore, input shaft 102 rotates. At this time, 1st drive gear 111 and 2nd drive gear 112 are fixed to input shaft 102. Therefore, 1st drive gear 111 and the 2nd drive gear rotate as well as input shaft 102. On the other hand, with regard to 3rd drive gear 113 and 4th drive gear 114, mesh type clutch 152 is not engaged to 3rd drive gear 113 and 4th drive gear 114. Therefore, mesh type clutch 152 is in a state of the free-rotation with respect to input shaft 102. That is, these gears run idle with respect to input shaft 102. Similarly with regard to 5th drive gear 115, this gear runs idle with respect to input shaft 102 because mesh type clutch 153 is not engaged with 5th drive gear 115. Therefore, the rotation of input shaft 102 is transformed to counter axis 103 through 1st drive gear 111 or 2nd drive gear 112.

Here, 5th driven gear 124, 4th driven gear 124, and 3rd driven gear 123 are fixed to counter axis 103. The 1st driven gear 121 and 2nd driven gear 122 are in a state of the idling with respect to counter axis 103. However, either 1st driven gear 121 or 2nd driven gear 122 is engaged with counter axis 103 according to the selection of mesh type clutch 151. In FIG. 5, mesh type clutch 151 is shifted to the side of 1st driven gear 121, a thus 1st driven gear 121 is engaged with the counter axis. As a result, 3rd drive gear 113 of input shaft 102, 4th drive gear 114, and 5th drive gear 115 are in the engaged state by 3rd driven gears 1 fixed to counter axis 103, 4th driven gear 124, and 5th driven gear 125. Therefore, these gears enter the state in which they run idle freely in input shaft 102 according to the gear ratio of each gear. And, 2nd driven gear 122 of counter axis 103 runs idle with respect to counter axis 103. Therefore, driven gear 122 is in a state of engagement with 2nd drive gear 112 fixed to the input shaft 102, and is run idle by 2nd drive gear 112. The torque from input shaft 102 is transformed from the 1st drive gear 111 fixed to input shaft 102 is to 1st driven gear 121 of counter axis 103 engaged with the gear. And, 1st driven gear 121 is in a state of engagement with counter axis 103 by mesh type clutch 151. Therefore, the torque is transferred from 1st driven gear 121 to counter axis 103 through mesh type clutch 151.

At this time, 3rd driven gear 123 is fixed to counter axis 103. This 3rd driven gear 123 is in a state of engagement with assist output gear 131 of assist axis 104. Therefore, the torque is transferred to assist output gear 131. At this time, assist mechanism 140 does not operate. Therefore, because assist input gear 130 and assist output gear 131 are running idle mutually, the torque transferred to assist output gear 131 does not transfer the torque to other axes. Further, the torque from the 2nd drive gear 112 fixed to input shaft 102 is transferred to assist input gear 130 through 2nd driven gear 122 which runs idle with respect to counter axis 103. However, assist input gear 130 and assist axis 104 in which the drive plate is provided and assist input gear 131 in which the driven plate are provided rotates mutually in an idle state without any relation, because the drive plate and the driven plate are not engaged in assist mechanism 140 as described above.

Under such a condition, when the shifting demand from 1st gear to 2nd gear is output, the command to activate assist mechanism 140 is first output with clutch 101 being engaged. In a word, the torque is transferred with drive plate 141 and driven plate 142 of assist mechanism 140 being slided by pressing piston 143 of assist mechanism 140. As a result, the rotating torque from input shaft 102 is transferred from the 2nd drive gear 112 fixed to input shaft 102 to assist input gear 130 fixed to assist axis 104 through 2nd driven gear 122 which is running idle by counter axis 103. Here, assist mechanism 140 is in a state in which piston 143 is pressed. Therefore, drive plate 141 and driven plate 142 transfer the torque while sliding. To sum up, the torque transferred to assist input gear 130 as shown in FIG. 6 is transferred to assist output gear 131 through assist mechanism 140. At this time, mesh type clutch 151 is still in a state of engagement with 1st driven gear 121. Therefore, the torque from input shaft 102 to counter axis 103 is transferred by using the following two routes. One is a route by way of 1st drive gear 111, 1st driven gear 121 engaged with 1st drive gear 111 and mesh type clutch 151. The other is a route by way of 2nd drive gear 112, 2nd driven gear 122 engaged with 2nd drive gear 112, assist input gear 130 engaged with and 2nd driven gear 122, assist mechanism 140 and assist output gear 131, and 3rd driven gear 123 engaged with assist output gear 131. At this time, in assist mechanism 140, drive plate 141 and driven plate 142 transfer the torque while sliding. Therefore, assist axis 104 and assist output gear 131 in which assist input gear 130 is provided rotate not at the same speed but at different rotation speeds.

Mesh type clutch 151 is shifted to the side of 2nd driven gear 122, and the engagement with 1st driven gear 121 is released when the torque transfer route via assist mechanism 140 is secured in such a state. FIG. 6 shows the state of no engagement in which mesh type clutch 151 is engaged neither with 1st driven gear 121 nor 2nd driven gear. At this time, the torque from input shaft 102 is transferred from 2nd drive gear 112 to 3rd driven gear 123 fixed to counter axis 103 via 2nd driven gear 122 which runs idle, assist input gear 130, assist mechanism 140 and assist output gear 131, and finally transferred to counter axis 103.

Even if the state of no engagement in which neither 1st driven gear 121 nor 2nd driven gear 122 is engaged with counter axis occurs temporarily when change the speed from 1st gear to 2nd gear, the torque from the engine is transferred to counter axis 103 through clutch 101, input shaft 102, 2nd drive gear 112, 2nd driven gear 122, assist input gear 130, assist mechanism 140, assist output gear 131 and 3rd driven gear 123. As a result, driving force can be prevented from not acting on counter axis 103 in the state of no engagement when shifting, and the shock feeling when shifting can be softened.

Next, after the torque is transferred by assist mechanism 140, mesh type clutch 151 is shifted to the side of 2nd driven gear 122 under the fixed condition of the shifting completion. As a result, mesh type clutch 151 engages with 2nd driven gear 122, and the operation command is output to assist mechanism 140. The pressing power to piston 143 of assist mechanism 140 is released, and driven plate 141 and drive plate 142 of assist mechanism 140 are released. As a result, the torque transfer between assist input gear 130 and assist output gear 131 disappears.

FIG. 7 shows the state in which mesh type clutch 151 is shifted to the 2nd driven gear side, and is engaged with 2nd driven gear 122, and drive plate 141 of assist mechanism 140 and driven plate 142 are released. When mesh type clutch 151 is engaged with 2nd driven gear 122 like this, the rotation of input shaft 102 is transferred to 2nd driven gear 122 engaged with 2nd drive gear 112 through the gear, and finally to counter axis 103 through 3rd driven gear 122 engaged with counter axis 103 by mesh type clutch 151.

It becomes possible to prevent the torque interruption while shifting by the operation of the above-mentioned assist mechanism 140.

The engine speed increases when the driver tries to depress the accelerator further, and rises the rotating speed of counter axis 103 through input shaft 102.
As a result, the control unit obtains a demand running gear ratio based on the accelerator command value and the vehicle speed. when the demand running gear ratio and the present gear ratio is different, the control unit outputs a drive command to shift selection mechanism 5 and assist mechanism 140. And, the actuator is activated by the drive command, assist mechanism 140 is driven, mesh type clutch 151 is shifted to the side of 1st driven gear 1, and the engagement with 2nd driven gear 122 is released. Further, mesh type clutch 152 of input shaft 102 is shifted to the side of 3rd drive gear 113, and then is engaged with 3rd drive gear 113. To prevent the torque interruption when shifting also in case that the shifting is performed from 2nd gear to 3rd gear, the torque is transferred via assist mechanism 140. Therefore, the shock feeling given to the driver when shifting can be softened.

In this embodiment, assist output gear 131 is engaged with 3rd driven gear 123 of counter axis 103. It is therefore, possible to soften the torque interruption occurred while shifting from 1st gear to 2nd gear, 1st gear to 3rd gear and 2nd gear to 3rd gear. Here, if the assist output gear 131 is operated when it is engaging with 4th driven gear 124 of counter axis 103, the torque interruption occurred while shifting-up to 4th gear can be softened, and if the assist output gear 131 is operated when it is engaging with 5th driven gear 125, the torque interruption occurred while shifting-up to all gear can be softened.

Further, the same effect as the case that assist output gear 131 is engaged with another driven gear can be achieved even in a state in which assist output gear 131 is engaged with 3rd driven gear 123, by suitably setting assist input gear 130 and assist output gear 131.

In a word, with regard to the torque by assist mechanism 140 while shifting, the inertia torque generated by the decrease in the engine speed and the torque of engine 10 is transferred to counter axis 103 through fixed gear ratio.

Here, the gear ratio from input shaft 102 to counter axis 103 via assist mechanism 140 is decided according to the following expression.

$$GRATIOASIST = GRATIO2CI \times GRATIO2AC \times GRATIO3CA$$

$GRATIO2CI = Z2\_DRIVEN/Z2\_DRIVE$: 2nd drive gear 2nd driven gear ratio.

$GRATIO2AC = ZA\_IN/Z2\_DRIVEN$: 2nd driven gear assist input gear ratio.

$GRATIO3CA = Z3\_DRIVEN/ZA\_OUT$: Assist output gear 3rd driven gear ratio.

Z2_DRIVEN: Number of 2nd driven gear and Z2_DRIVE: Number of 2nd drive gear.

ZA_IN/: Number of assist input gear, and ZA_OUT: Number of assist output gear and Z3_DRIVEN: Number of 3rd driven gear.

In this embodiment, assist input gear 130 is the same as 2nd gear drive gear 112, and assist output gear 131 is same as 3rd drive gear 113. At this time, the gear ratio of transmission from input shaft 102 to counter axis 103 via assist mechanism 140 becomes the same as the 3rd gear gear ratio. It is also possible to change assist input gear 130 and assist output gear 131 in consideration of the gear ratio of 2nd driven gear 122 of counter axis 103 and 3rd driven gear 123 and the sizes etc. of each gear.

Figure 8:
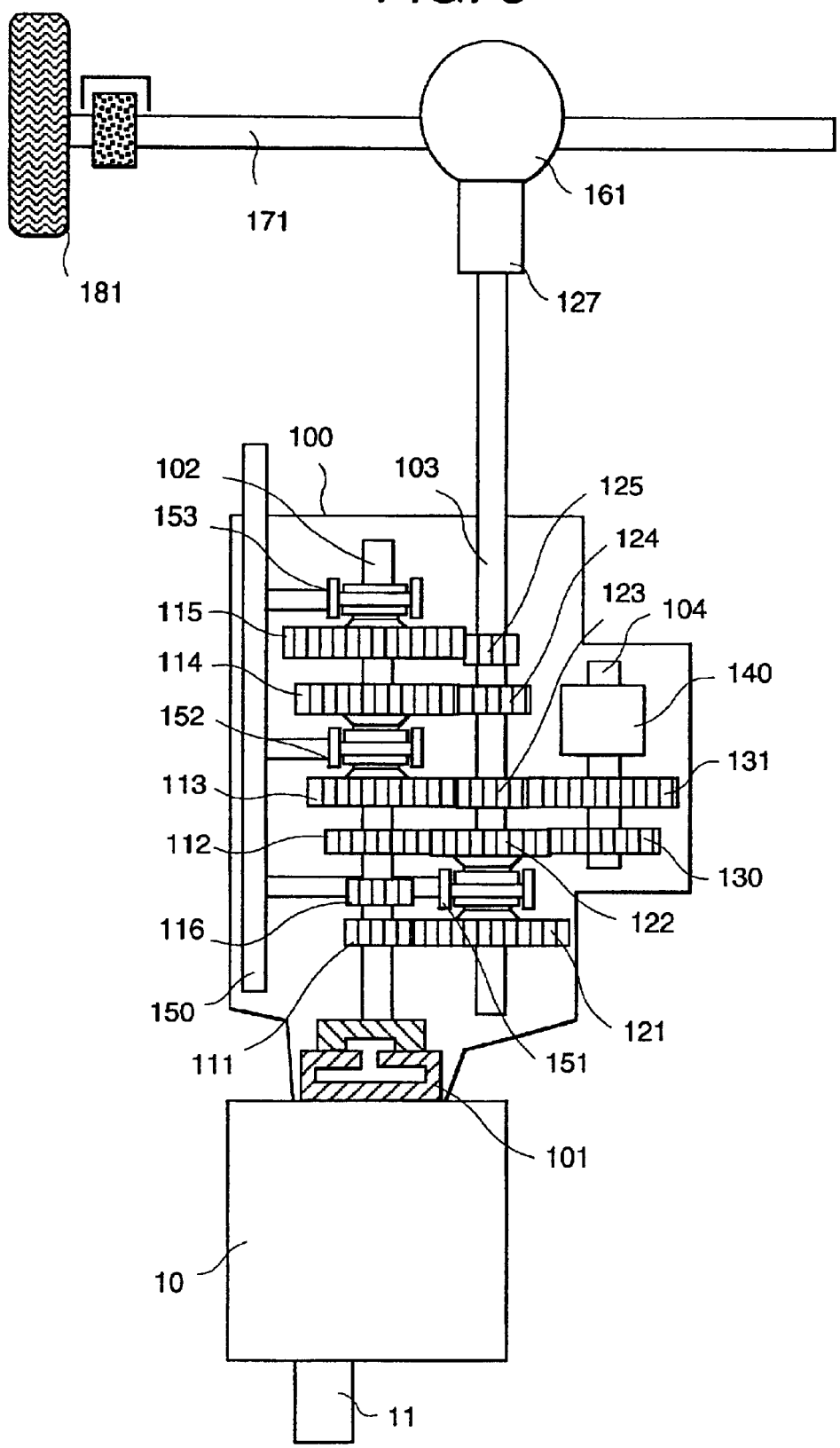
FIG. 8 is a view showing the whole configuration of the automatic transmission according to a second embodiment of the present invention.
Figure 9:
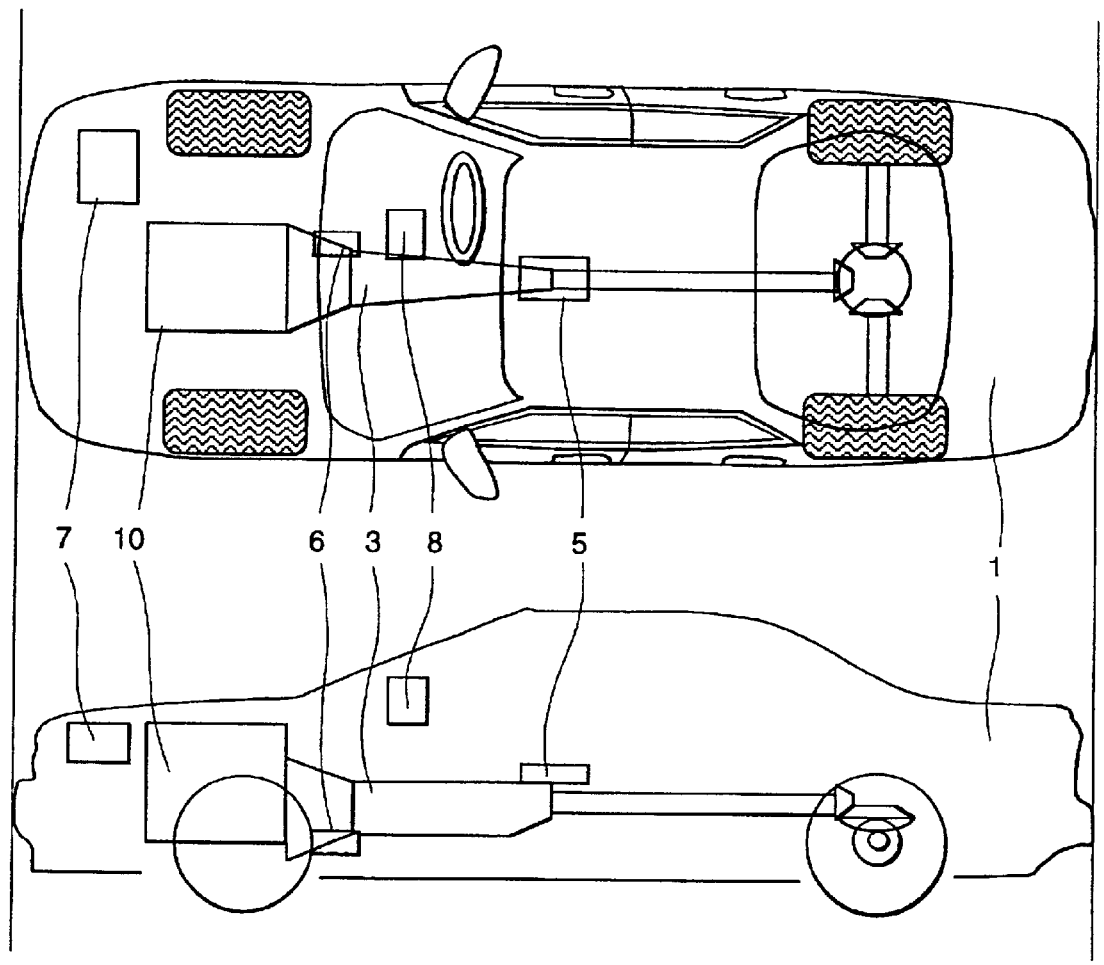
FIG. 9 is a view showing the position where the automatic transmission according to this embodiment is arranged in the body of a car.

Referring now to FIG. 8 and FIG. 9, the second embodiment of the present invention in case of the automatic transmission of the FR (front engine rear drive) car will be explained.

FIG. 8 is a view showing the whole configuration of the automatic transmission according to a second embodiment of the present invention. FIG. 9 is a view showing the position where the automatic transmission according to this embodiment is arranged in the body of a car.

As shown in FIG. 8, engine 10 and automatic transmission 100 are arranged back and forth. The internal structure of transmission is the same as FIG. 1. The rotation of counter axis 103 which is the output from transmission is transferred to final reduction gear 127 through the propeller shaft. Thereby, axle 171 of the rear wheel is rotated through differential gear 161, and rear wheel tires 181 are rotated.

Automatic transmission 100 like this is provided at the center of the running direction of body 1 as shown in FIG. 8. In FIG. 9, reference numeral 10 designates an engine, 100 an automatic transmission, 5 a shift selection mechanism, 6 drive mechanism fo clutch 101, 7 a hydraulic power unit used for shift selection mechanism 5, clutch drive mechanism 6, and assist mechanism 140 and 8 a display unit.

Figure 12:
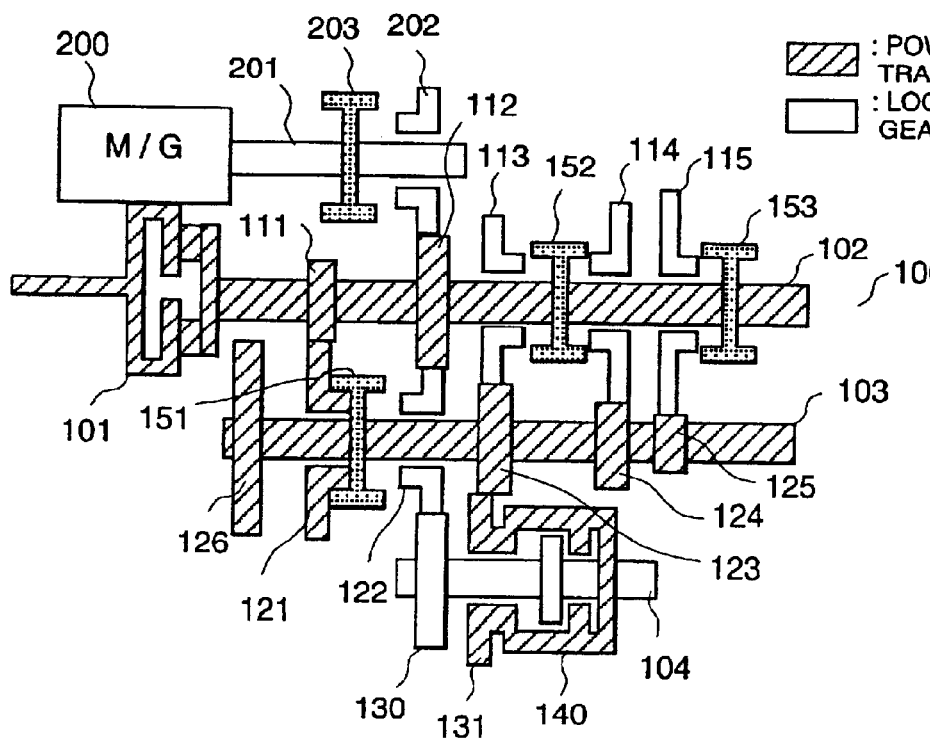
FIG. 12 is an illustration of the operation of the engagement and the disengagement of the mesh type clutch of a motor generator and the mesh type clutch of a transmission when running normally.
Figure 10:
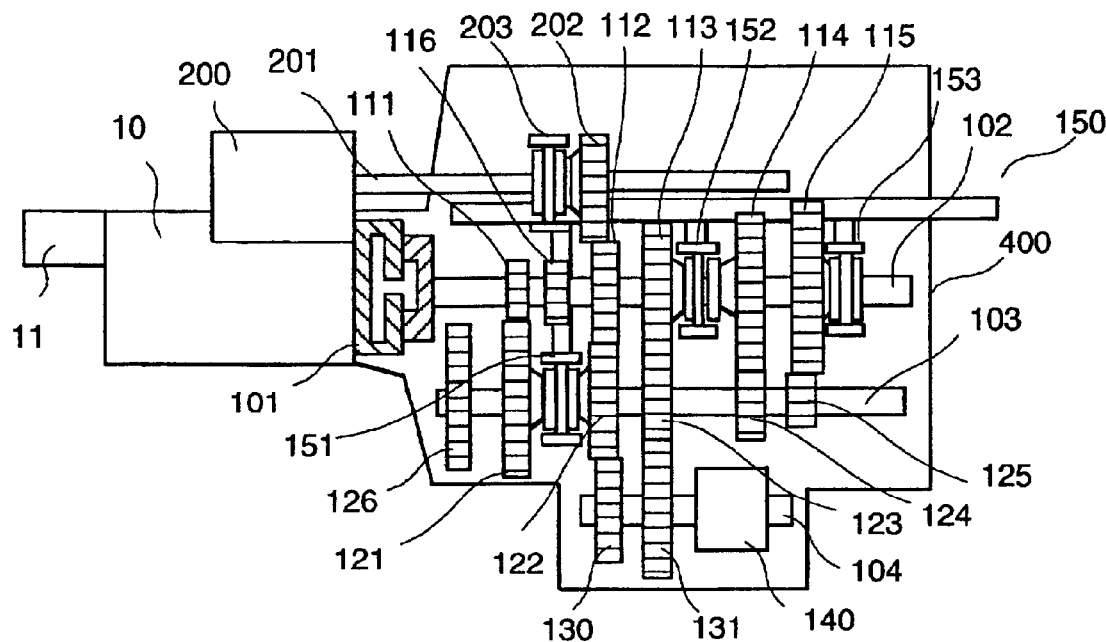
FIG. 10 is a view showing the whole configuration of the automatic transmission according to a first embodiment of the present invention in case that a motor generator is used.
Figure 11:
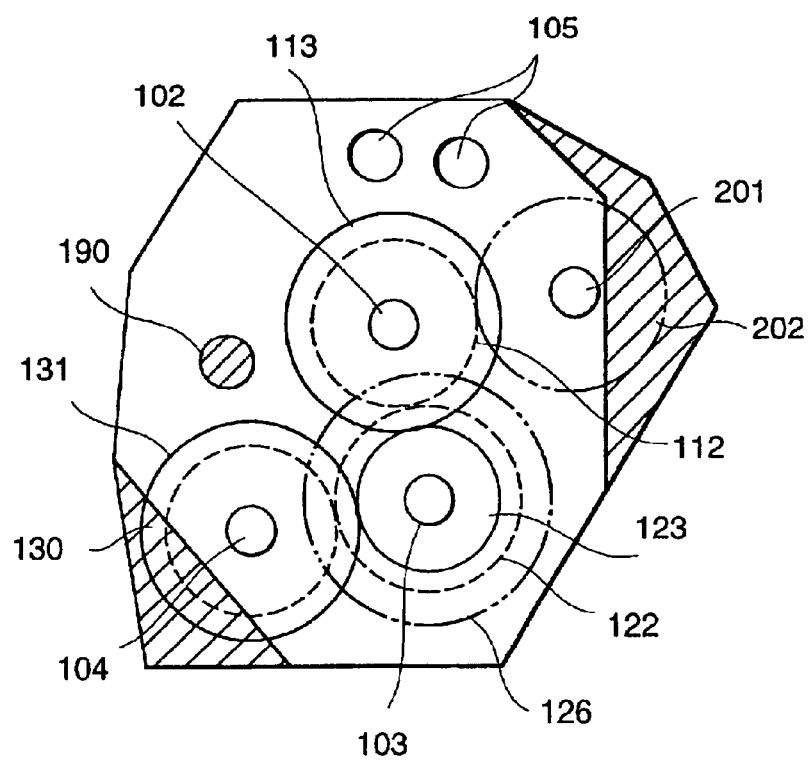
FIG. 11 is a right side view of the automatic transmission shown in FIG. 10.
Figure 13:
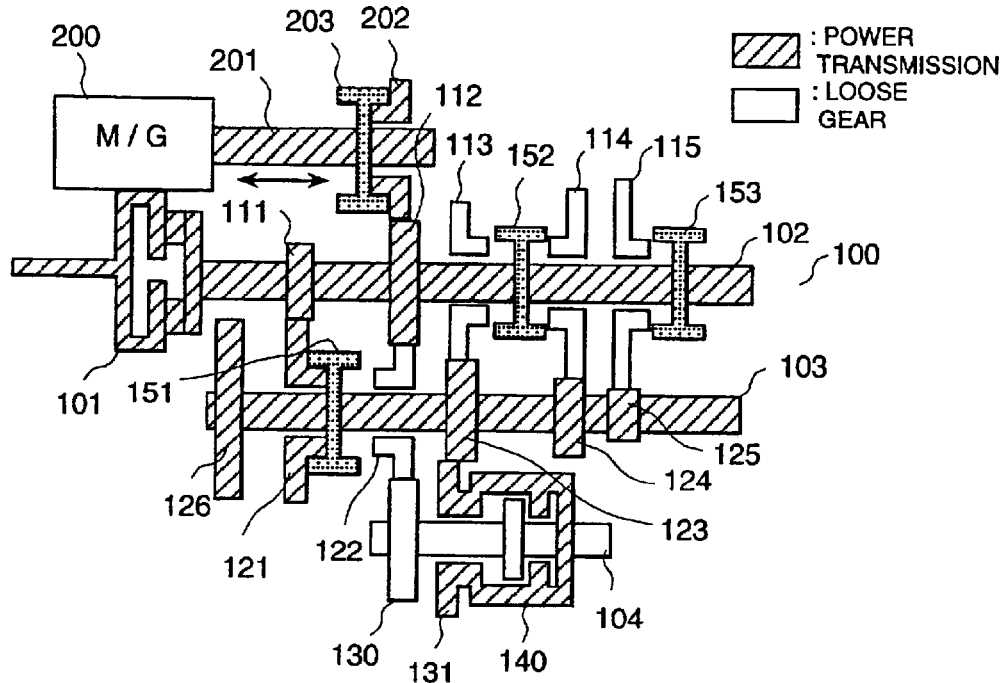
FIG. 13 is an illustration of the operation of the engagement and the disengagement of the mesh type clutch of a transmission in the regeneration and the torque assist by the motor generator when accelerating and decelerating.
Figure 14:
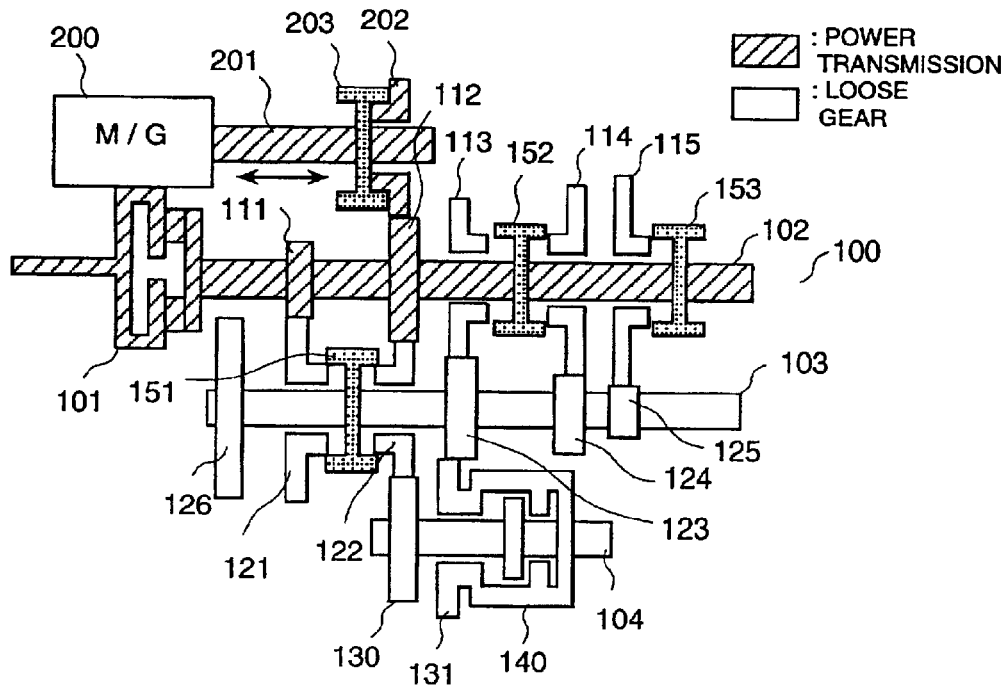
FIG. 14 is figure to explain the operation of the engagement and the disengagement of the mesh type clutch of a transmission in the regeneration of the engine idling and the engine starting by the motor generator when the car is stopped.

Referring next to FIG. 10–FIG. 14, the configuration of the automatic transmission when the torque assist by the motor generator, the energy regeneration, and the engine starting are performed will be explained as a third embodiment of the present invention. FIG. 10 is a view showing the whole configuration of the automatic transmission according to a first embodiment of the present invention in case that a motor generator is used. FIG. 11 is a right side view of the automatic transmission shown in FIG. 10. Further, FIG. 12–FIG. 14 are illustrations to explain the operation of the engagement and the disengagement of the clutch which makes the motor generator when charging at idling and transmission engaged, the engine start which is the regeneration and the driving force source, and torque assist by the motor generator while running.

Automatic transmission 400 is provided with motor generator 200, motor generator axis 201, motor input gear 202, and mesh type clutch 203 in addition to the transmission shown in FIG. 1 and FIG. 9. Motor generator axis 201 is supported free-rotatably in parallel to input shaft 102, counter axis 103, and assist axis 104. Mesh type clutch 203 and motor input gear 202 provided free-rotatably in motor generator axis 201 are provided in motor generator axis 201. This mesh type clutch 203 is engaged with motor generator axis 201, and rotates with motor generator axis 201. This mesh type clutch 203 can engage with motor generator axis 201, and slide on motor generator axis 201. Mesh type clutch 203 and motor input gear 202 are engaged by shifting mesh type clutch 203 to the right of FIG. 10. As a result, the rotation of motor generator axis 201 is transferred to motor input gear 202. Motor input gear 202 is engaged with 2nd drive gear 1 fixed to input shaft 102. Therefore, the rotation of motor generator axis 201 is transferred to input shaft 102 through motor input gear 202 and 2nd drive gear 112. In a word, the torque of motor generator 200 is transferred to 2nd drive gear 112 fixed to input shaft 102 through motor generator axis 201, mesh type clutch 203, and motor input gear 202, by making mesh type clutch 203 of motor generator axis 201 engaged, and driving force source is transferred to input shaft 102. As a result, the torque assist by motor generator 200 can be achieved. Further, The torques from motor generator 200 are given only to input shaft 102 engaged with engine 10 when mesh type clutch 152, 153 of input shaft 102 and mesh type clutch 151 of counter axis 10 are in a released state. Therefore, the motor generator can be used as a starter for engine 10. Engine 10 can be started by motor generator 200 by releasing mesh type clutches 151, 152, 153 while idling and by putting mesh type clutch 203 into the engaged state.

Oppositely, the torque of input shaft 102 driven by engine 10 through clutch 101 is transferred to motor input gear 202 which is provided free-rotatably on motor generator axis 201 which is engaged with 2nd drive gear 112 fixed to input shaft 102. Therefore, the torque of engine 10 is transferred to motor generator axis 201 through 2nd drive gear 112 fixed to input shaft 102, motor input gear 202, and mesh type clutch 203, by engaging mesh type clutch 203 of motor generator axis 201 with motor input gear 202, and motor generator is rotated. As a result, the torque assist by motor generator 200 can be achieved. As a result, power generation by engine 10 becomes possible.

In addition, the rotation of counter axis 103 is transferred to input shaft 102 in the state in which some gears are engaged while decelerating. Therefore, the rotation energy while decelerating can be regenerated by engaging mesh type clutch 203 of motor generator axis 201 to motor input gear 202.

FIG. 11 is a right side view of the automatic transmission shown in FIG. 10. The upper right shaded portion and the left lower shaded portion designate the increased portions of the existing transmission. As understood from FIG. 11, the increased portions of the transmission is small even when assist mechanism 140, and the mechanism for connecting motor generator 200 and transmission 400 are added. It is therefore possible to install the transmission to the existing car. Namely, it becomes possible to install in the existing vehicle only by changing slightly the size of the transmission.

The normal running by this motor generator 200, the torque assist and the torque regeneration, and the operation of the engine starting and the charge by the engine will be explained with reference to FIGS. 12–14.

FIG. 12 is an illustration of the operation of the engagement and the disengagement of the mesh type clutch of a motor generator and the mesh type clutch of a transmission when running normally. FIG. 12 shows an example of the normal running or the example of the running at the 1st gear, in which mesh type clutch 151 is shifted to the side of the 1st driven gear 121, and engaged with 1st driven gear 121. At this time, mesh type clutch 203 fixed on motor generator axis 201 on which motor generator 200 is provided is in the released state. Therefore, the torque from the engine makes motor input gear 202 to run idle, and thus the torque is not transferred to motor generator axis 201. Therefore, motor generator 200 does not become the load for the rotation while usually running.

FIG. 13 shows the case in which the torque assist is performed by motor generator 200 while running, and the case in which the torque from the tires is regenerated while decelerating. At this time, with regard to the torque assist while running, the torque from motor generator 200 rotates motor generator axis 201. Here, mesh type clutch 203 of motor generator axis 201 makes motor input gear 202 and motor generator axis 201 engaged. Therefore, the torque of motor generator axis 201 is given to input shaft 102 of transmission through motor input gear 202. As a result, the torque assist while running can be obtained. To the contrary, the torque of input shaft 102 of transmission rotates motor input gear 202 of motor generator axis 201 while decelerating. At this time, because mesh type clutch 203 of motor generator axis 201 is engaged, the torque of motor input gear 202 is transferred to motor generator axis 201. As a result, motor generator 200 is rotated.

This torque is regenerated as electrical energy by motor generator 200.

FIG. 14 shows the case in which the engine 10 is started by motor generator 200 while the engine is in a stop state, and the case in which the charging is performed by motor generator 200 while the engine is in an idling state and thus the vehicle is stopped. At this time, mesh type clutches 151, 152 and 153 are in the released state. Here, when engine 10 is stopped, motor axis 200 and motor input gear 202 are engaged by mesh type clutch 203 of motor generator axis 201. As a result, the torque of motor generator 200 is transferred through motor axis 200, mesh type clutch 203, and motor input gear 202 to rotate input shaft 102. At this time, because clutch 101 has been engaged, the torque of input shaft 102 is transferred to engine 10, and engine 10 can be started. Further, mesh type clutches 151, 152, 153 are released and clutch 101 is engaged when engine 10 is in an idling state and the vehicle is stopped. At this time, when motor input gear 202 and motor generator axis 201 are engaged by mesh type clutch 203, the torque of input shaft 102 rotated by engine 10 is transferred to motor generator 200 through motor input gear 202, mesh type clutch 203, and motor input shaft 201. Therefore, in motor generator 200, the torque transferred from engine 10 is converted into electrical energy, and the battery etc. are charged.

As mentioned above, the torque assist, the regeneration, and the engine starting, etc. can be carried out by activating mesh type clutch 203 of motor generator axis 201. The torque assist by motor generator 200 can be also used to assist the torque while shifting.

Figure 16:
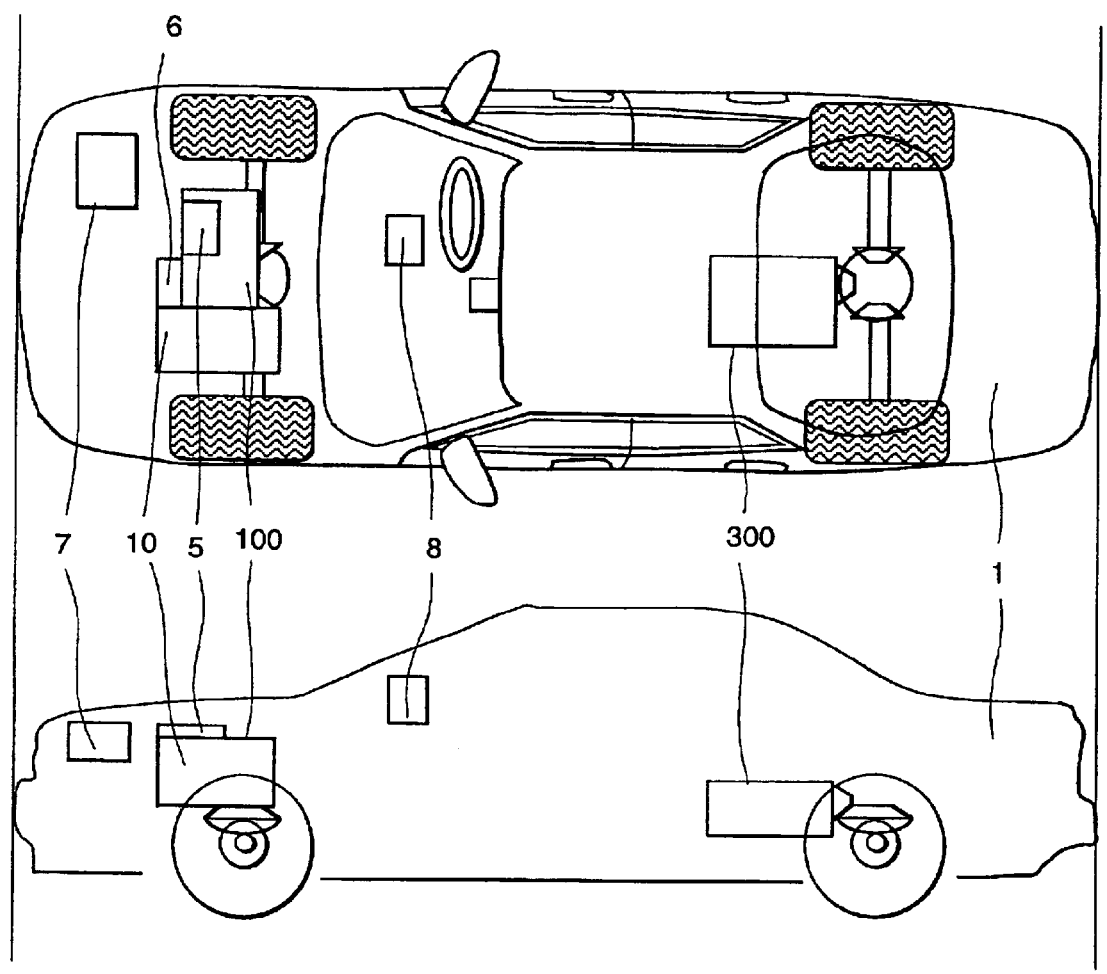
FIG. 16 is a view showing the position where the automatic transmission and the drive mechanism according to this embodiment are arranged in the body of a car.
Figure 17:
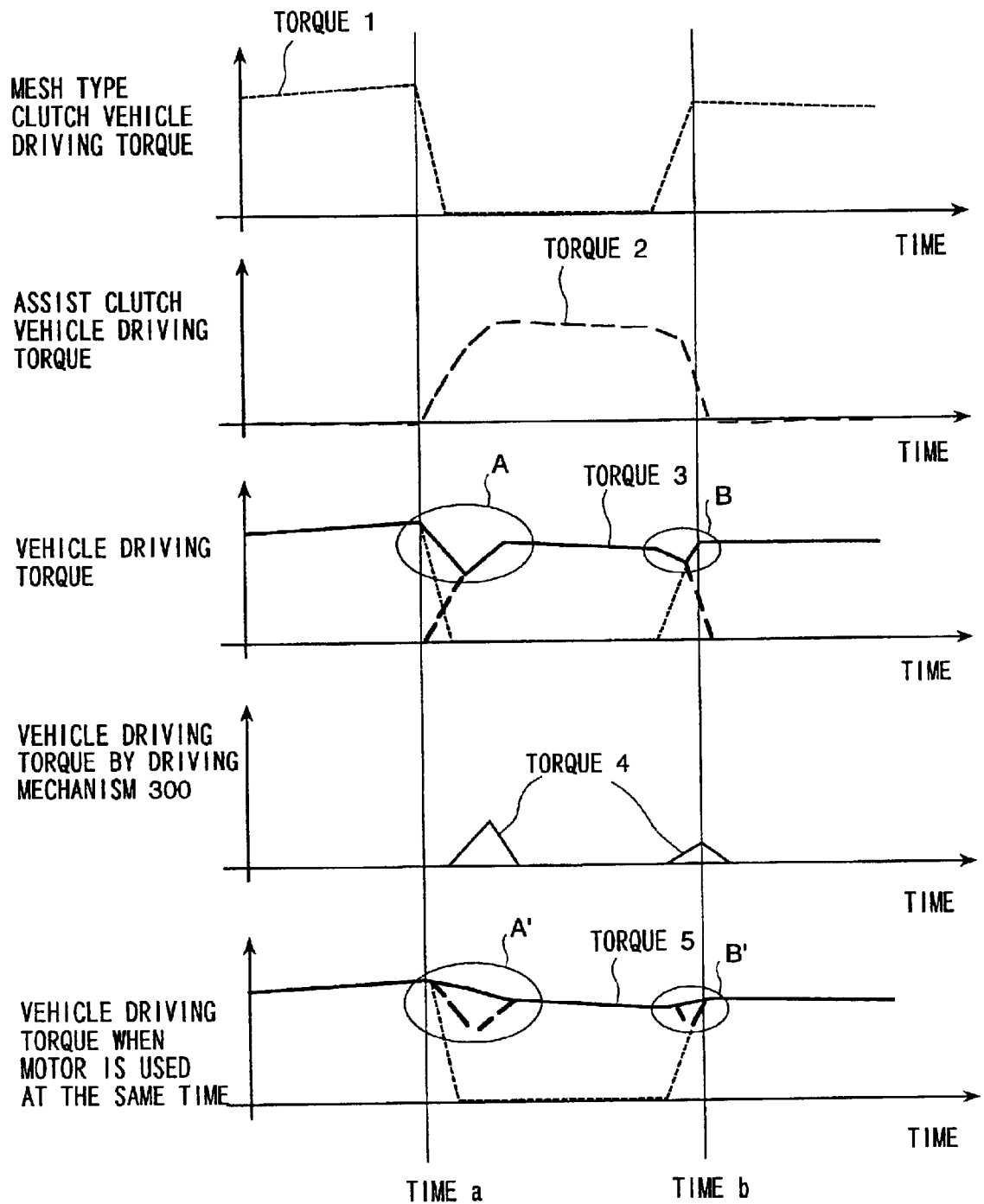
FIG. 17 is a view showing the state of the driving torque while shifting by the automatic transmission and the drive mechanism according to this embodiment.

Referring next to FIG. 15, FIG. 16, and FIG. 17, the transmission according to the fourth embodiment of the present invention will be explained.

FIG. 15 is a view showing the whole configuration of the automatic transmission according to the fourth embodiment of the present invention, in which the 4WD is achieved by using an automatic transmission and a motor generator shown in FIG. 1. FIG. 16 is a view showing the position where the automatic transmission and the drive mechanism according to this embodiment are arranged in the body of a car. FIG. 17 is a view showing the state of the torque while shifting.

In the embodiment shown in FIG. 15, automatic transmission 100 and engine 10 shown in FIG. 1 are provided, and the wheels in the front portion or the rear portion of the car are driven by them. Further, drive 300 is provided in other wheels not engaged with engine 10 and automatic transmission 100. In FIG. 15, automatic transmission 100 shown in FIG. 1 is used. However, even when automatic transmission 400 equipped with motor generator 200 shown in FIG. 10 is used, it is similar.

Automatic transmission 100 and drive mechanism 300 like this are juxtaposed with the engine between front wheel tires of body 1 as shown in FIG. 16 for instance. In FIG. 16, reference numeral 10 designates an engine, 100 automatic transmission, 5 shift selection mechanism, and 6 drive mechanism for clutch 101. Further, 7 designates hydraulic power unit used for shift selection mechanism 5, clutch drive mechanism 6 and assist mechanism 140. In addition, 8 designates a display unit and 300 drive mechanism. Although the example of providing automatic transmission 100 and engine 10 forward of the car is shown in FIG. 16, Similarly, it is possible to arrange them in the rear portion of the car.

Drive mechanism 300 in addition to engine 10 and automatic transmission 100 is provided as shown in FIG. 15. Drive mechanism 300 is motor generator 310, motor generator gear 312 provided free-rotatably on the axis of motor generator 310, clutch 313 for engaging or disengaging motor generator gear 312 with the motor generator axis, and drive gear 311 fixed on the axis for rotating differential gear 161 which drives wheel 181 with being engaged with motor generator gear 312.

The mesh type clutch etc. are used as clutch 313.

Clutch 313 is released during the normal running, and motor generator gear 312 is engaged free-rotatably with the motor generator axis. Therefore, motor generator 310 does not become resistance during the running. The torque of wheel 181 is transferred to motor generator 310 through shaft 171, differential gear 161, drive gear 311, motor generator gear 312 and clutch 313 by bring clutch 313 into the engaged state when decelerating. At this time, motor generator 310 operates as a dynamo, and regenerates the rotational torque of wheels 181. Oppositely, when clutch 313 is engaged and motor generator 310 is driven as a motor, wheels 181 are driven through clutch 313, motor generator gear 312, drive gear 311, differential gear 161, and shaft 171. As a result, the torque assist is obtained while running. Further, the improvement of the shifting performance can be obtained by executing the torque assist while shifting. This respect will be explained referring to FIG. 17.

FIG. 17 shows the state of the change in torque while shifting. The state of the torque change shifting to FIG. 17 is shown. The graph of the top of FIG. 17 shows the torque (torque 1) transferred from engine 10 to wheel 180 via mesh type clutches 151, 152, 153 of automatic transmission 100. The shifting is begun at time a, and mesh type clutches 151, 152 and 153 are released. The shifting ends at time b, and mesh type clutch 151, 152 and 153 are engaged. As a result, because the torque is not transferred from time a to time b by mesh type clutch 151, 152 and 153, the torque is interrupted (torque 1). Next, the second graph from the top of FIG. 17 shows the torque (torque 2) transferred with assist mechanism 140 of automatic transmission 100. When the shifting is begun at time a, assist mechanism 140 begins the torque transfer while sliding, and transfers the torque from time a to time b. Because the shifting ends at time b, assist mechanism 140 does not transfer the torque. Therefore, transfer torque of assist mechanism 140 becomes 0. The final driving torque (torque 3) of the vehicle when the torque transfer of the first and the second graphs from the top of FIG. 17 is executed is shown in a third graph from the top of FIG. 17. The driving torque of the vehicle becomes the sum of transfer torque (torque 1) by mesh type clutch 151, 152 and 153 and transfer torque (torque 2) by assist mechanism 140. Therefore, the torque while shifting, which cannot be transferred according to mesh type clutch 151, 152 and 153 can be obtained by assist mechanism 140 as shown in FIG. 17. Therefore, the torque interruption while shifting disappears, and a smooth torque transfer (torque 3) is achieved. However, the change in torque might be generated at the shifting beginning part (A) and the shifting completion part (B) as shown in the third graph of FIG. 17. At this time, the torque is transferred more smoothly by generating the driving torque by drive mechanism 300. In a word, a little driving torque (torque 4) is generated at the shifting beginning part (A) and the shifting completion part (B) as understood from the vehicle driving torque by drive mechanism 300 shown in the second graph from the bottom of FIG. 17. As a result, the final vehicle driving force becomes the sum of torque 1, torque 2, and torque 4 of FIG. 17. Therefore, smoother transfer torque (torque 5) can be obtained as shown in figure.

Here, the driving torque while shifting can be obtained by drive mechanism 300 though the torque transfer while shifting is performed by assist mechanism 140 of automatic transmission 100, and drive mechanism 300 is used to smooth the transfer torque further. Further, when automatic transmission 400 shown in FIG. 10 is applied, the driving torque while shifting can be obtained by the driving torque of drive mechanism 300 and the driving torque by the motor generator provided at automatic transmission 400.

This embodiment relates to a system for softening the decelerating feeling or a kind of shock feeling given to the driver by assisting in the torque from input shaft 102 to counter axis 103 by assist mechanism 140 in the state of no engagement when shifting from a certain gear ratio to another gear ratio. When this system is provided in the front engine front drive vehicle or the small front engine rear drive vehicle as an automatic transmission, assist mechanism 140 can be put into the transmission without changing the length of axis of input shaft 102 and counter axis 103 by providing assist axis 104 besides input shaft 102 and counter axis 103 and providing assist mechanism 140 on assist axis 104.

Further, the addition of the gears for the torque transfer from input shaft 102 to assist mechanism 140 can be made a minimum by adopting the configuration in which the torque of input shaft 102 is transferred to assist input gear 130 of assist mechanism 140 through driven gear 122 provided free-rotatably on counter axis 103, and the number of the parts can be decreased according to this embodiment.

In addition, the part added to the present gear type transmission can be reduced, and the structure of automatic transmission 100 can be miniaturized according to this embodiment.

It is possible to assemble easily by providing assist mechanism 140 in independent assist axis 104.

The start at idling stop, the torque assist during running, and the energy regeneration while decelerating can be obtained according to this embodiment without enlarging the size of automatic transmission 400 by providing motor generator axis 201 in parallel to other axes and separately.

Figure 18:
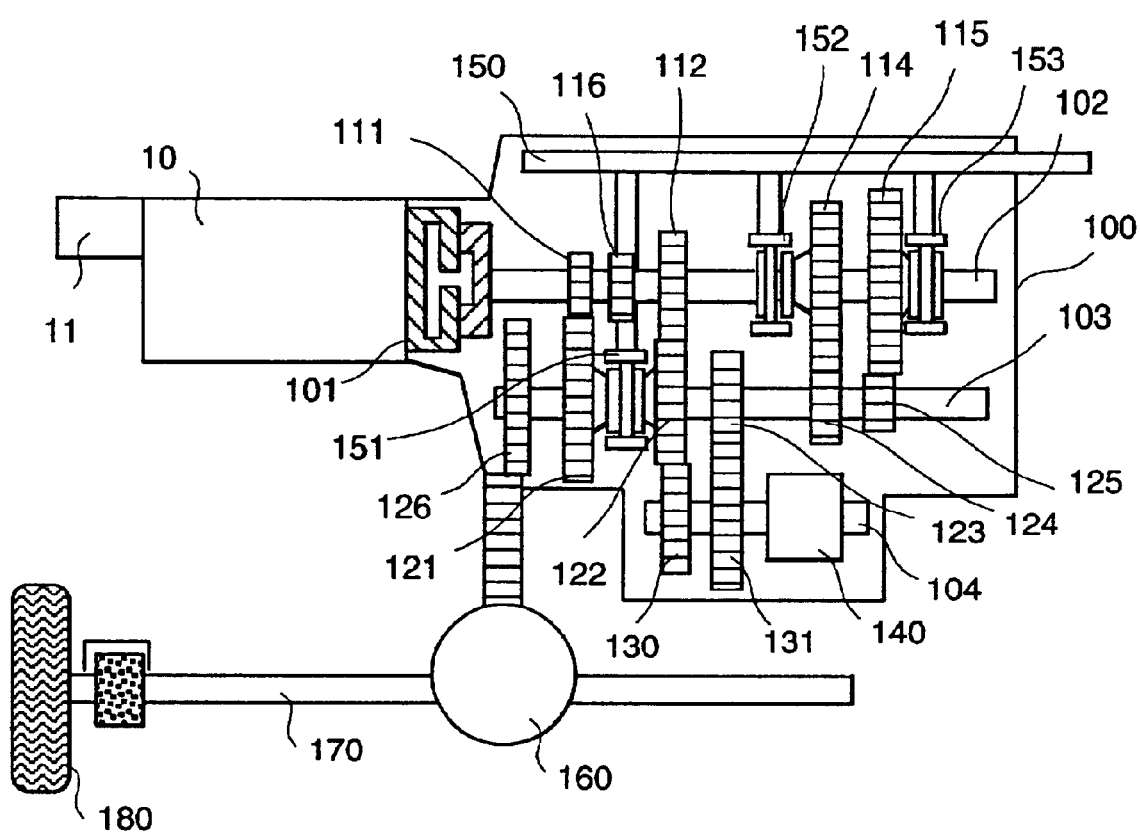
FIG. 18 is a view showing the whole configuration of the automatic transmission according to a fifth embodiment of the present invention.

Next, the transmission according to the fifth embodiment of the present invention will be explained with reference to FIG. 18. FIG. 18 shows another embodiment of transmission 400 shown in FIG. 1.

In this embodiment, 3rd drive gear 113 arranged on 1st axis (input shaft) 102 in FIG. 1 is removed as shown in FIG. 18. FIG. 18 shows an example in which the gear with the same number of teeth and diameter as 3rd drive gear 113 arranged on 1st axis (input shaft) is applied to assist output gear 131. In the example of FIG. 18, the torque of motor 10 is transferred, through clutch 101, 1st axis (input shaft) 102, 2nd drive gear 112, 2nd driven gear 122, assist input gear 130, assist mechanism 140, assist output gear 131, 3rd driven gear 123, to the second axis (counter axis) 103. Because assist output gear 131 has the same number of teeth and diameter as the 3rd drive gear, the torque transfer at this time becomes a case of the 3rd gear gear ratio and the same torque transfer. In a word, the state of 3rd gear can be obtained by completely engaging assist mechanism 140. As a result, the number of gears can be decreased more than that of the example shown in FIG. 1, and low-cost, lightening, and the decrease of the inertia of the body of revolution can be obtained. Because assist mechanism 140 is not used except the shifting in FIG. 1, drive loss of assist mechanism 140 can be reduced.

The transmission according to the sixth embodiment of the present invention will be explained with reference to FIG. 19.

FIG. 19 shows an example in which assist mechanism 140 is provided on the side of 1st axis (input shaft) 102. The upper part of FIG. 19 is a sectional view of the transmission seen from the side. Further, the lower part of FIG. 19 is a sectional view of the transmission seen from the right side of the sheet.

As shown in FIG. 19, assist input gear 130 and assist output gear 131 are arranged to engage with the gear provided on the 1st axis (input shaft) 102. In the example of FIG. 19, assist input gear 130 is engaged with 2nd drive gear 112 engaged on 1st axis 102 (input shaft). Assist output gear 131 is engaged with 3rd drive gear 113 provided free-rotatably on 1st axis 102 (input shaft). In such a configuration, an upper right hatched part becomes large compared with the existing transmission as shown in the sectional view of the bottom of FIG. 19. Like this, it is also possible to arrange assist mechanism 140 so as to engage with the gear of the side of 1st axis (input shaft) 102. In this case, even when the increase in the transmission is not allowed in the lower part of the transmission, it is possible to install assist mechanism 140 in the transmission. Further, the increase in the transmission can be suppressed by sharing reverse idle axis 190 and assist axis 104 though assist mechanism 140 is arranged on the axis different from reverse idle axis 190 in FIG. 19. The torque transfer while shifting in the configuration like FIG. 19 is obtained as follows. Namely, the rotation driving force of motor 110 is transferred, through clutch 101, 1st axis (input shaft) 102, 2nd drive gear 112 engaged with 1st axis input shaft 102, assist input gear 130 engaged with 2nd drive gear 112, assist mechanism 140, assist output gear 131, 3rd drive gear 113 engaged rotatably to 1st axis (input shaft) 102 engaged with assist output gear 131, to the second axis 103 (counter axis).

Figure 20:
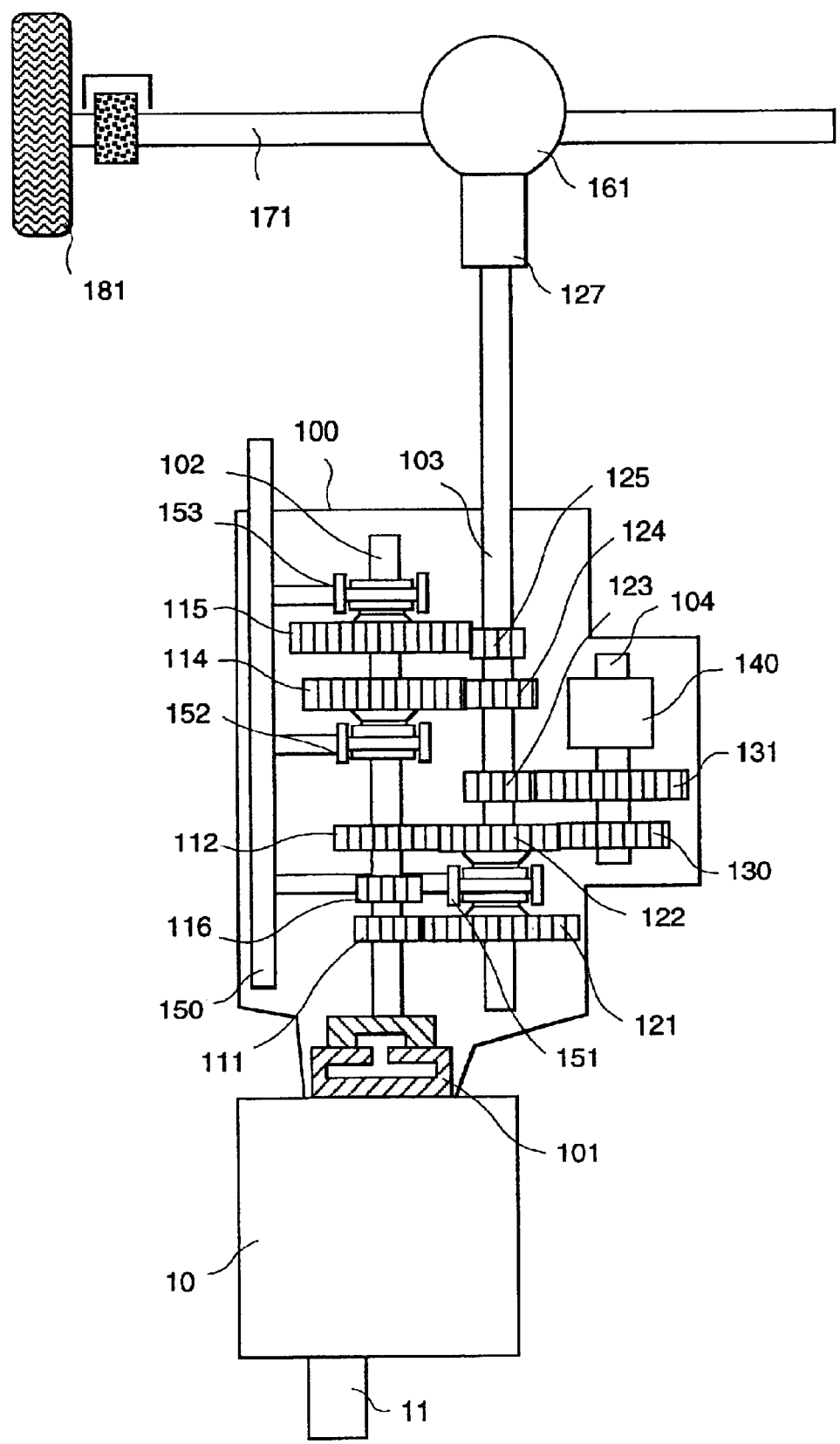
FIG. 20 is a view showing the whole configuration of the automatic transmission according to a seventh embodiment of the present invention.

Next, the transmission according to the seventh embodiment of the present invention will be explained with reference to FIG. 20. FIG. 20 is another embodiment in which the transmission is used for the front engine rear drive.

FIG. 20 shows the example in which the transmission for the front engine front drive of FIG. 18 is applied for the front engine rear drive. In this example, the same gear as the 3rd drive gear is used as assist output gear 131 arranged in assist axis 104, and the 3rd drive gear arranged in 1st axis (input shaft) 102 is removed. The torque from 1st axis (input shaft) 102 to the 2nd axis (output shaft) 103 while shifting is transferred through a gear (2nd drive gear 112 in FIG. 20) engaged with 1st axis (input shaft) 102, a gear (2nd driven gear 122 in FIG. 20) which runs idle freely with respect to 2nd axis (counter axix) 103 engaged said gear, assist input gear 130 provided on assist axis 104, assist output gear 131, assist mechanism 140, and 3rd driven gear 123 engaged with the 2nd axis (counter axis) 103. In addition, the same running as that by using the 3rd gear ratio can be obtained by engaging assist mechanism 140 when running by using the 3rd gear. Therefore, the decrease in the number of the 3rd drive gears becomes possible in this case, and the number of the parts can be decreased. Further, lightening can be obtained as a result, the inertia of the body of revolution can be reduced, and the load to the clutch can be decreased.

Figure 21:
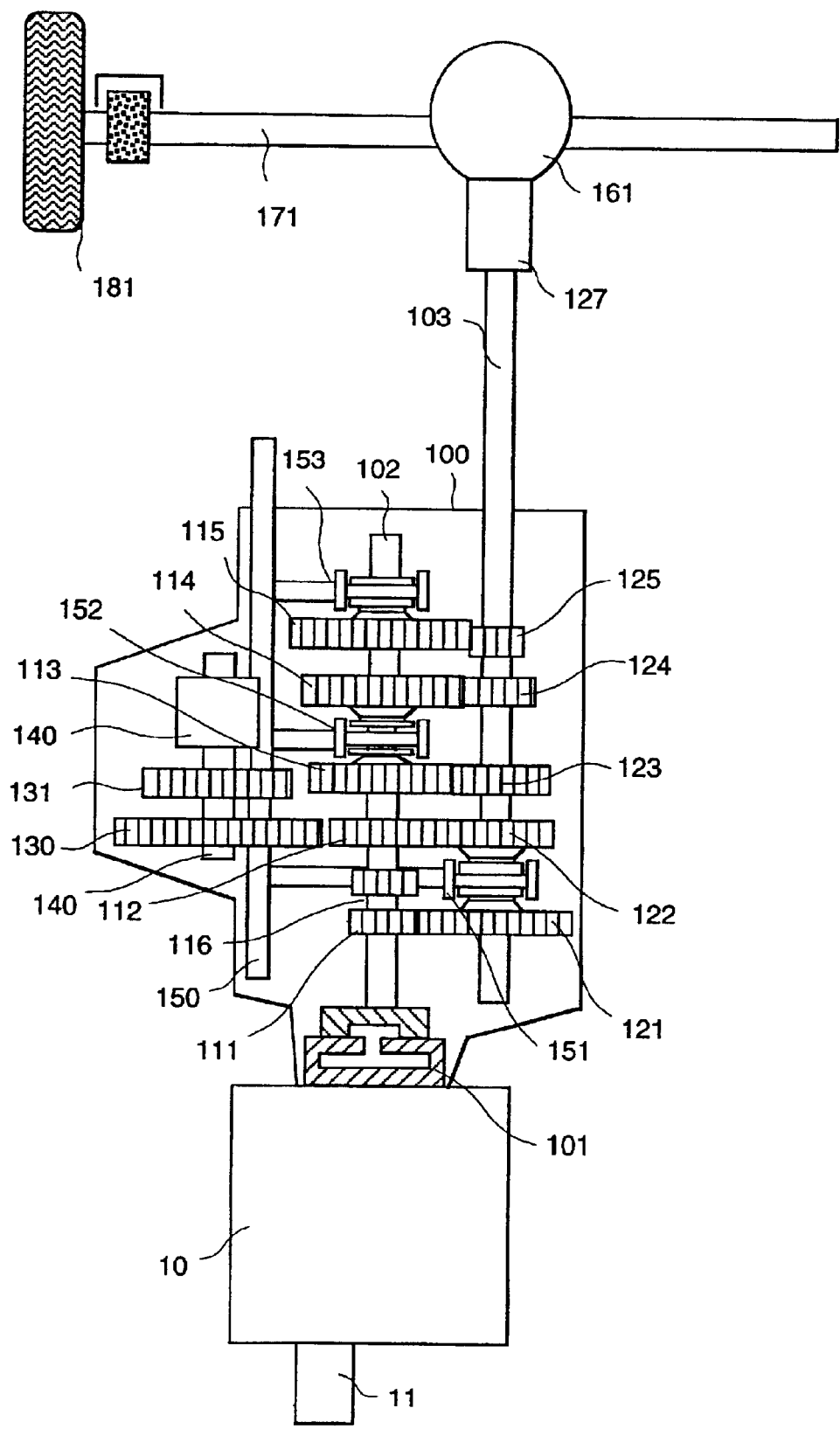
FIG. 21 is a view showing the whole configuration of the automatic transmission according to an eighth embodiment of the present invention.

Next, the transmission according to the eighth embodiment of the present invention will be explained with reference to FIG. 21. FIG. 21 is a view showing the whole configuration of the automatic transmission according to an eighth embodiment of the present invention. FIG. 21 is another embodiment in which the transmission is used for the front engine rear drive.

FIG. 21 shows the example in which the transmission for the front engine front drive of FIG. 19 is applied for the front engine rear drive. In this example, assist output gear 131 and assist input gear 130 arranged in assist axis 104 is arranged to engage with a gear provided on 1st axis (input shaft) 102. Also in this case, the torque from 1st axis 102 (input shaft) to the 2nd axis 103(output shaft) while shifting is transferred through a gear (2nd drive gear 112 in FIG. 20) engaged with 1st axis (input shaft) 102, a gear (2nd driven gear 122 in FIG. 20) which runs idle freely with respect to 2nd axis (counter axix) 103 engaged said gear, assist input gear 130 provided on assist axis 104, assist output gear 131, assist mechanism 140, and 3rd driven gear 123 engaged with the 2nd axis (counter axis) 103. In this case, even when there is no room of arrangement in the lower part of the transmission, it is possible to apply as well as the case in the FF vehicle of FIG. 19. In addition, the miniaturization of transmission can be achieved by sharing reverse idol axis and assist axis 104.

Figure 22:
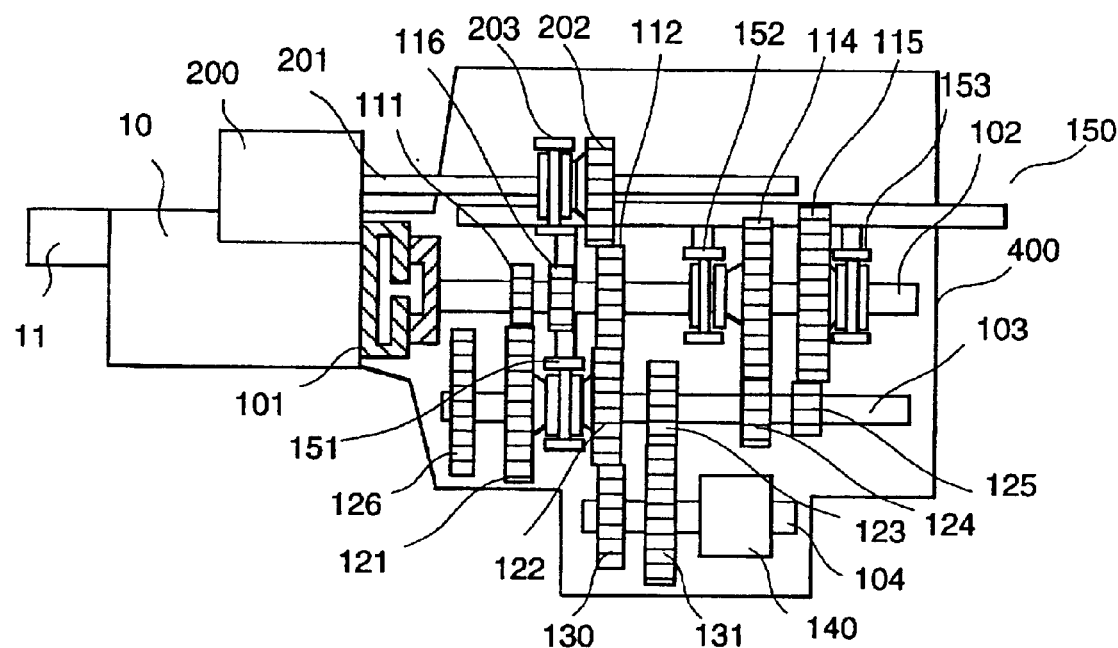
FIG. 22 is a view showing the whole configuration of the automatic transmission according to a ninth embodiment of the present invention.

The transmission according to the ninth embodiment of the present invention will be explained with reference to FIG. 22. FIG. 22 is another embodiment in which motor generator 200 is installed.

In FIG. 22, motor generator 200 is provided in the transmission according to the embodiment of FIG. 18 and 20 previously shown. In this transmission, the gear with the same number of teeth and diameter as 3rd drive gear is applied to assist output gear 131 arranged on assist axis 104. 3rd drive gear 113 arranged on 1st axis (input shaft) 102 is removed. The torque transfer while shifting is as has already described. Further, the running of 3rd gear becomes the same state as the running state of the 3rd speed gear by engaging assist mechanism 140. Therefore, the 3rd drive gear can be removed by adopting the configuration shown in FIG. 22, and the lightening of transmission can be obtained as a result, the inertia of the body of revolution can be reduced, and the cost can be reduced.

There is an effect that when the torque transfer from 1st axis 102(input shaft) to the 2nd axis 103(output shaft)while shifting is done by the 3rd gear gear ratio, the torque transfer route while shifting and the torque transfer route of 3rd gear under running can be shared, and the number of gears can be suppressed to the minimum. Oppositely, there is an effect that by setting separately the torque transfer route while shifting and the torque transfer route while normally running, the free setting of the amount of the torque transfer while shifting becomes possible.

Although the same number of teeth and diameter as 3rd drive gear have been used for assist output gear in the above-mentioned embodiment, it does not limited to the 3rd gear gear, it can be applied similarly to the gear with different gear ratio.

Figure 23:
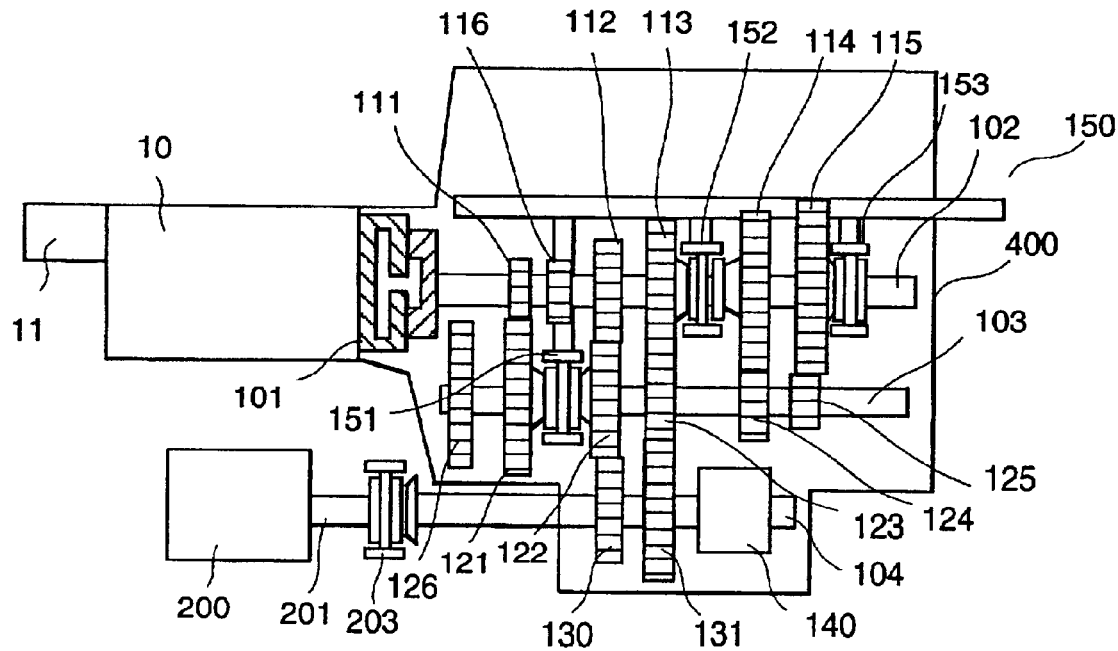
FIG. 23 is a view showing the whole configuration of the automatic transmission according to a tenth embodiment of the present invention.

Next, the transmission according to the tenth embodiment of the present invention will be explained with reference to FIG. 23. FIG. 23 is a further embodiment in which motor generator 200 is installed.

In FIG. 23, assist axis 104 and motor generator axis 201 for motor generator 200 are arranged in the same axis. In a word, although assist axis 10 on which assist mechanism 140 is provided and motor generator axis 201 for inputting the power of motor generator 200 are provided on different axes in FIGS. 10 and 22, motor generator axis 201 and assist axis 104 are arranged on the same axis in the embodiment of FIG. 23. The degree of freedom of the arrangement of motor generator 200 is obtained by making these axes separate as FIGS. 10 and 22. There are effects that the number of motor input gears 202 can be decreased by making motor generator axis 201 and assist axis 104 on a same axis like FIG. 23, that is, the number of parts can be decreased, and the miniaturization and making to low-cost can be obtained. In the configuration of FIG. 23, mesh type clutch 203 performs the engagement and the disengagement of motor generator axis 201 and assist axis 104.

For example, in the normal running, The motor generator enters the state of disengagement with transmission 400 by releasing mesh type clutch 203. Namely, it does not become the load for the normal running. Next, the torque assist and the regeneration are discussed. Mesh type clutch 203 is engaged when the torque assist is carried out while running. In this case, the rotation driving force of the motor generator is transferred to 2nd driven gear 122 provided free-rotatably on the second axis 103 (counter axis) through motor generator axis 203, mesh type clutch 203, assist axis 104, and assist input shaft 130 engaged by assist axis 104. Here, 2nd driven gear 122 is engaged with 2nd axis 103 (counter axis) by mesh type clutch 151 during the running by using the 2nd gear. Therefore, the rotation driving force by motor generator 200 is transferred to 2nd axis (counter axis) 103, and the torque assist can be obtained. Further, 2nd driven gear 122 runs idle with respect to the second axis 103(counter axis) excluding the 2nd gear running. Therefore, the rotation driving force is transferred to 2nd drive gear 112 engaged with the first axis 102 (input shaft) engaged with 2nd driven gear 122. As a result, the rotation driving force of motor generator 200 is transferred to 1st axis 102 (input shaft), and assists in the torque of the rotation drive of 1st axis 102 (input shaft). Further, the regeneration during the deceleration can be performed by transferring the torque from the tire from second axis 103 (counter axis) to motor generator 200 through the transmission route opposite to the transmission route of the torque assist.

With regard to the engine starting and the idling charge, all mesh type clutches 151,152 and 153 become the released state by entering the neutral state while stopping. At this time, the rotation driving force of motor generator 200 is transferred to motor 10 through motor generator axis 201, mesh type clutch 201, assist axis 104, assist input gear 130, 2nd driven gear 122 which runs idle in the second axis 103(counter axis), 2nd drive gear 112 engaged with 2nd drive gear 112, 1st axis (input shaft) 102, and clutch 101. As a result, the motor stopped by the idling stop etc. while stopping can be driven. In addition, The charge by motor generator 200 can be obtained by making the rotation driving force of motor 10 transfer to motor generator 200 through the opposite route.

Next, the configuration and control method of the transmission control system according to the first embodiment of the present invention will be explained with reference to FIGS. 24 to 29.

Figure 24:
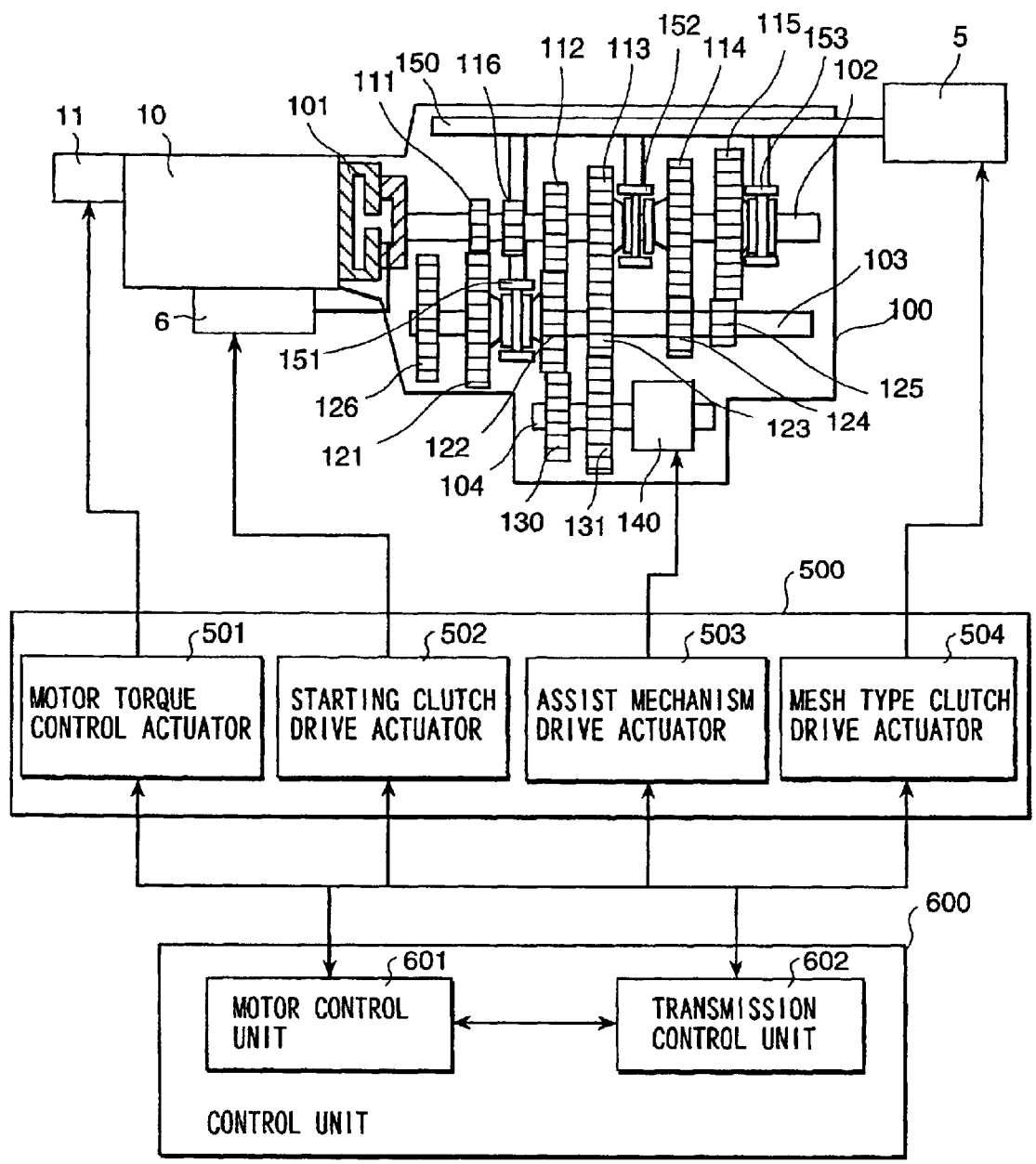
FIG. 24 is a view showing the whole configuration of a control system of the automatic transmission according to a first embodiment of the present invention in which the first embodiment of the present invention shown in FIG. 1 is used as an example.

FIG. 24 shows the configuration of the transmission control system in which the first embodiment of the present invention shown in FIG. 1 is used as an example. The transmission control system can be similarly made even if the transmission according to another embodiment is used.

The transmission control system comprises actuator unit 500 for driving transmission 400 and motor 10, etc. and control unit 600. Actuator unit 500 has the following component as shown in FIG. 24. Motor torque control actuator 501 for controlling the generation torque of motor 101, starting clutch drive actuator 502 for controlling clutch 101 which transfers and interrupts the torque between motor 10 and transmission 400, assist mechanism drive actuator 503 for controlling assist mechanism 140 which transfers the torque while shifting in transmission 400, mesh type clutch drive actuator 504 for controlling mesh type clutch 151,152 and 153 by which gear position of transmission 400 is set. The gasoline engine etc. are used here as motor 10, and motor torque control actuator in this case includes actuator etc. which drives electronically controlled throttle 1. Furthermore, the torque of motor 10 can be adjusted by adjusting the amount of fuel injection or the ignition timing.

Control unit 600 are composed of motor control unit 601 and transmission control unit 602. However, it is also possible to carry out all the control processing by using one control unit. Motor control unit 601 and transmission control unit 602 execute the control while mutually cooperating.

Motor control unit 601 basically controls motor 10. Transmission control unit 602 controls transmission 400. In a word, when shifting, transmission control unit 602 sends a control command to starting clutch drive actuator 502, assist mechanism drive actuator 503, and mesh type clutch drive actuator 504. Each actuator drives clutch 101, assist mechanism 140, and mesh type clutches 151, 152, 153, and executes the shifting. Further, the shift control unit sends a control command also to motor control unit 601, and controls the generation torque of motor 10 by using motor torque control actuator 501. Actually, there are an actuator which uses the hydraulic system, an actuator which uses an electric system such as motors, etc. as an actuator which drives the mechanism of transmission 400.

Next, A method of controlling the transmission control system according to this embodiment will be explained with reference to FIG. 25–FIG. 29.

Figure 25:
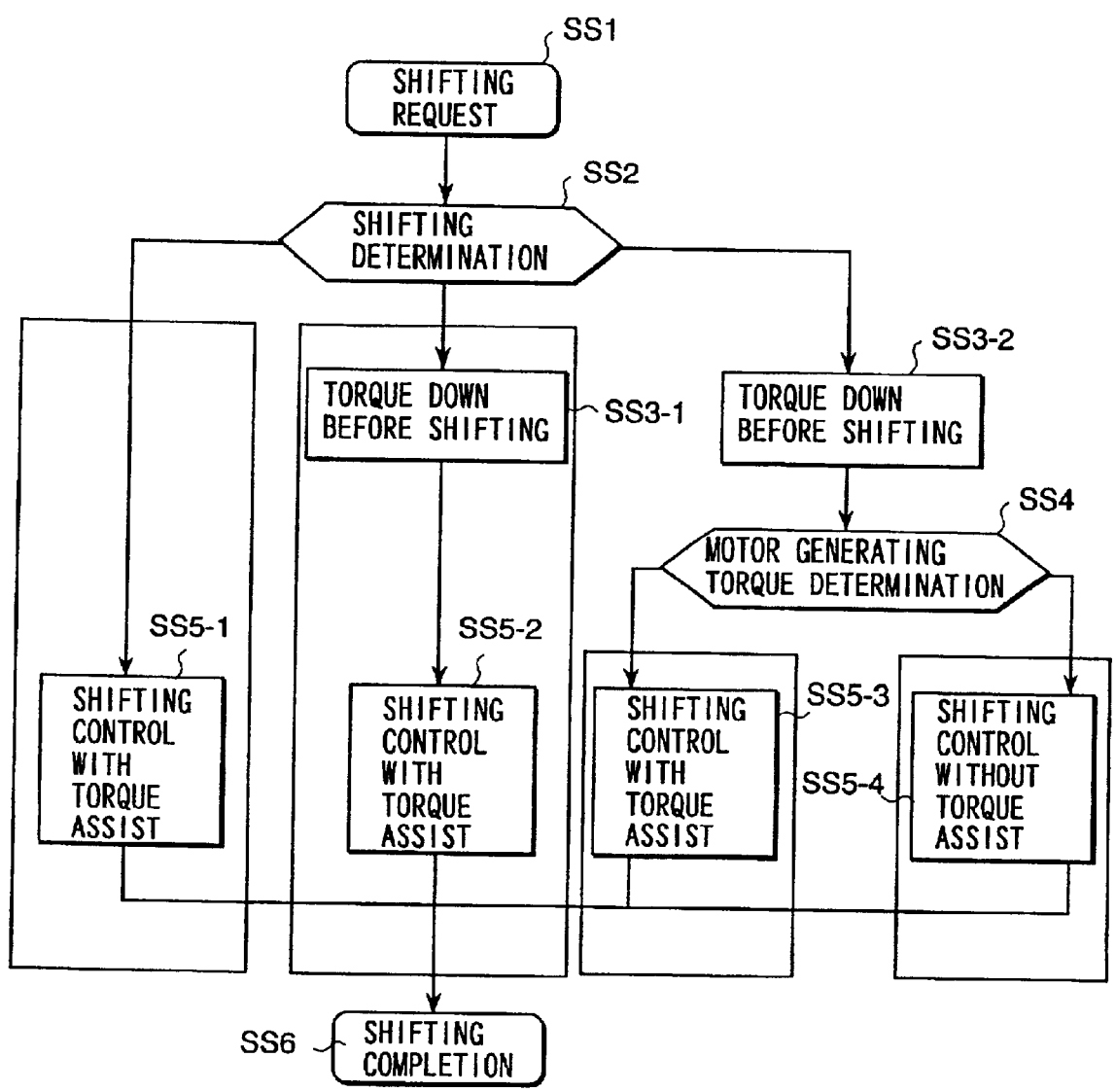
FIG. 25 is a flow chart illustrating the content of the control of the automatic transmission control system according to the first embodiment of the present invention.

FIG. 25 is a flow chart illustrating the content of the control of the automatic transmission control system according to the first embodiment of the present invention. Further, FIG. 26–FIG. 29 each is a flow chart illustrating the content of the control of the automatic transmission control system according to the first embodiment of the present invention.

the shift control processing is executed according to the shifting demand as shown in FIG. 25.

The shift control processing is executed first according to the shifting demand in step SS1.

After the shifting is demanded, the method of shifting is determined in step SS2. For example, the shifting method is determined by using the device for taking a driver's command, or it is judged automatically by using transmission control unit 602. In the judgment of the shifting method of step SS2, one of four control methods with slightly different shifting feeling as shown in FIG. 26–FIG. 29 is selected.

In step SS2, when the first control method is selected, shift control with the torque assist which uses assist mechanism 140 is carried out in step SS5-1. Here, an example of a first shift control will be explained with reference to FIG. 26.

Figure 26:
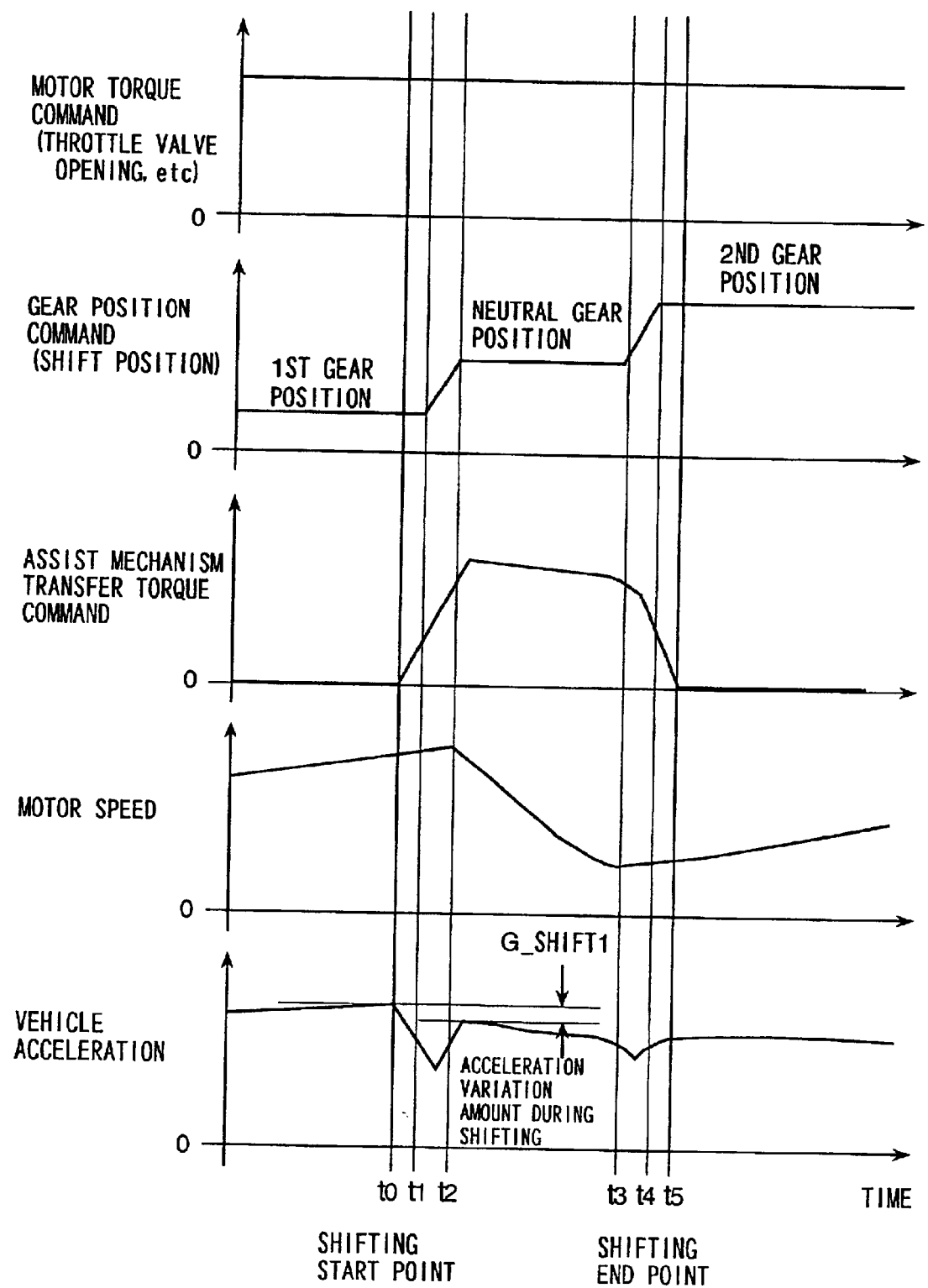
FIG. 26 is a timing chart showing the operation of the control system of the automatic transmission according to the first embodiment of the present invention and the acceleration of the vehicle which installs it.

FIG. 26 shows a timing chart of back and forth acceleration of the vehicle where the transmission is provided, the revolution speed of the motor, the command to each actuator from the shifting beginning to the shifting end. This figure shows a timing chart of the transfer torque command, the motor revolution speed, and the acceleration of the vehicle, and shows the case where the shifting from 1st gear to 2nd gear is performed.

The shifting operation is begun at time t0 as shown in FIG. 26. Assist mechanism transfer torque command is first output to assist mechanism 140 from transmission control unit 602 at the shifting beginning, and the torque assist is performed by assist mechanism 140. When the torque assist is performed, the torque transferred at the gear position of 1st gear decreases, and the torque transferred by assist mechanism 140 rises. As a result, the torque given to mesh type clutch 151 which decides the gear position of 1st gear decrease, and mesh type clutch 151 can be disengaged. Therefore, the command of the gear position is output from transmission control unit 602 to change from 1st gear to the neutral at time t1 as shown in the second graph of FIG. 26.

The torque is transferred by using assist mechanism 140 though the gear becomes to be at a neutral position when mesh type clutch 151 is released (time t2). Therefore, As shown in the lowest graph of FIG. 26, the acceleration of the vehicle does not drop up to 0. That is, the torque-omission feeling when shifting disappears. Namely, the sense which the acceleration feeling comes off while accelerating disappears. At this time, the torque command to assist mechanism 140 is output, and the torque-omission while shifting is prevented. At the same time, because the transfer torque generated by assist mechanism 140 becomes the load of motor 10, the revolution speed of motor 10 falls as shown in the second graph from the bottom of FIG. 25. Here, when the revolution speed of motor 10 changes into the revolution speed corresponding to the next gear position (2nd gear), mesh type clutch 151 becomes possible to engage with the side of 2nd gear.

The transfer torque command by assist mechanism 140 is output to perform the rotation control of motor 10 and torque assist while shifting.

When the revolution speed of motor 10 changes up to the speed corresponding to the 2nd gear (time t3), the shifting command to 2nd gear is generated. Mesh type clutch 151 works to make 2nd driven gear 122 to engage with the second axis 103 (counter axis).

As a result, mesh type clutch 151 completes the engagement with the 2nd gear side at time t4, and the shifting is completed at time t5. At this time, the transfer torque command to assist mechanism 140 becomes 0, and the running state at the gear position of 2nd gear is established.

The shifting from 1st gear to 2nd gear is completed by the above-mentioned operation. Although the example here relates to the shifting from 1st gear to 2nd gear, and it can be applied similarly to another shifting.

In this embodiment, the back and forth acceleration generated in the vehicle while shifting is controlled to become more than 0.0 m/s as in the acceleration of the vehicle at the lowest graph of FIG. 26. That is, the acceleration of the vehicle becomes small more than 0 when the torque cannot be transferred while shifting. However, because the torque transfer can be achieved while shifting in this embodiment, the acceleration of the vehicle can become more than 0.0 m/s$^2$.

The torque command to motor 10 is constant as shown in the top graph of FIG. 26. In this case, It is necessary to make the torque more than the torque generated by motor 10 to lower the revolution speed of motor 10 while shifting. Because the inertia torque is generated according to the decrease in the revolution speed of motor 10, the assist torque while shifting becomes larger. Therefore, the amount G_SHIFT1 of the change in the acceleration of the vehicle while shifting becomes smaller as shown in the bottom of FIG. 26. The back and forth acceleration which the human being can perceive is 0.3 m/S$^2$≈0.03 G according to Maconnel, Automotive Technology Handbook 3, Examinations and Evaluations P14 (Automotive Technology Association). We thought from such a numerical value that a big sense of incompatibility is not feeled in general driver's sense if the change in the acceleration of the vehicle while shifting is 0.1 G (1.0 m/S$^2$) or less. Actually, the acceleration change while shifting is about 0.1 G (1.0 m/s$^2$) as an example of automatic transmission (AT) by the present hydraulic torque converter as described in the document of ROBOTISED POWERSHIFT AMTS (ANTHONY O'NEILL, ANDREW HARRISON:RICARDO). It is thought that it is desirable to suppress the acceleration change while shifting from this result to about at least 0.1 G in the automatic transmission. In FIG. 25, the torque generated by motor 10 is constant while shifting. Therefore, the amount of the torque assist by assist mechanism 140 can be enlarged, and the amount of the acceleration change while shifting can be reduced more than 0.1 G. In this case, it is necessary to enlarge the torque which can be transferred by using assist mechanism 140. However, the acceleration when shifting can be reduced, and an excellent shifting performance can be obtained. Therefore, there is big effect in riding comfort. For instance, it is possible to make the amount G_SHIFT1 of the change in the acceleration of the vehicle to about 0.03 G–0.05 G which human being cannot perceive. At this time, although the acceleration change falls for time t1–t2 after the shifting begins to change the speed, the driver does not feel the sense of incompatibility of the amount of the acceleration change when shifting so much because the time interval t1–t2 is very short. Further, there are advantages that the drive area is steady and the exhaust is steady, because the engine torque need not be adjusted by the throttle operation etc. when motor 10 is a gasoline engine.

Figure 27:
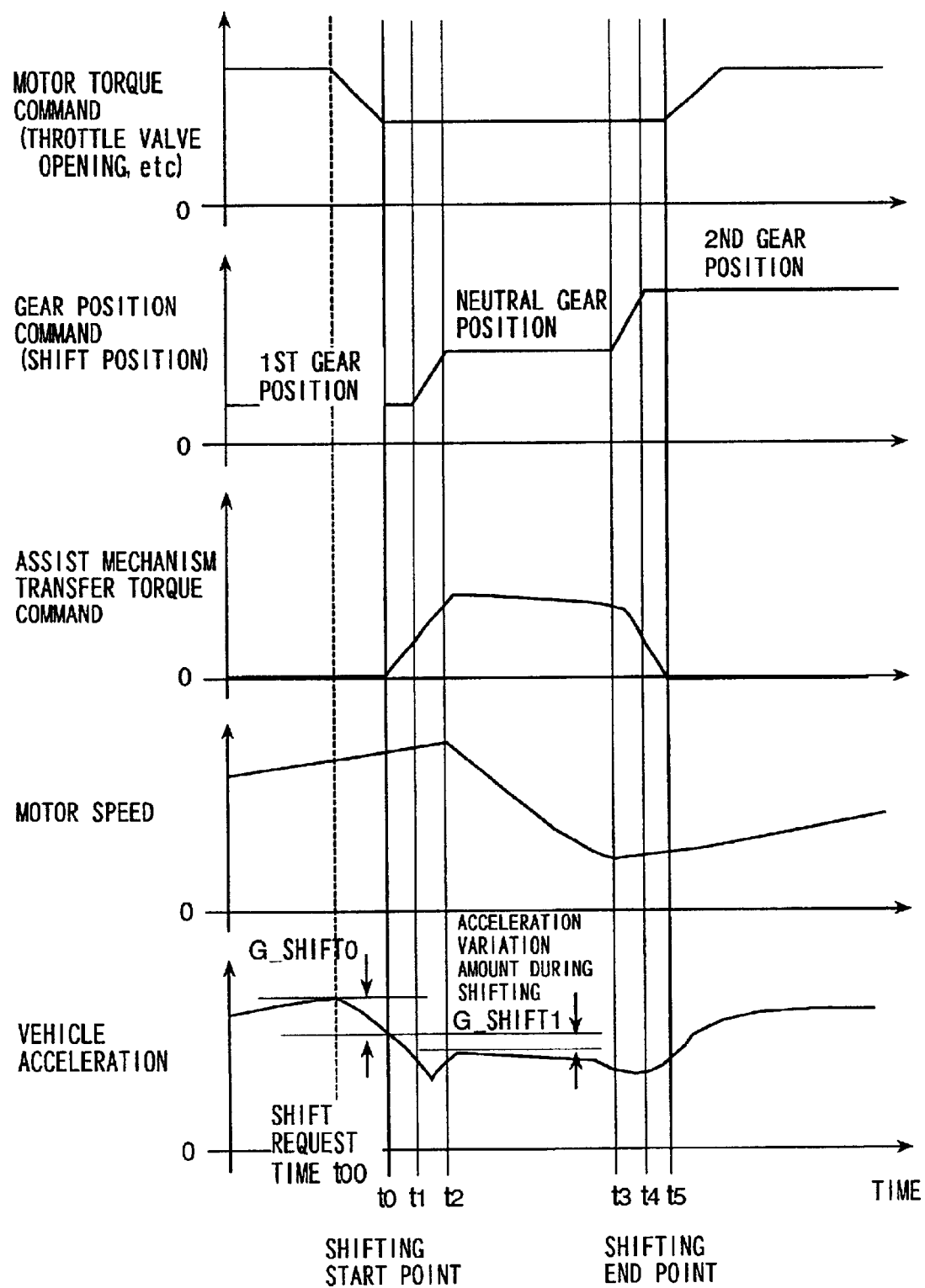
FIG. 27 is a timing chart showing other operation of the control system of the automatic transmission according to the first embodiment of the present invention and the acceleration of the vehicle which installs it.

When the second control method is selected in step SS2, the processing advances to step SS3-1, and the down of the torque control of motor 10 is performed. After then, the shift control with the torque assist which uses assist mechanism 140 of step SS5-2 is performed. Here, an example of the second shift control will be explained with reference to FIG. 27. FIG. 27 is a view similar to FIG. 26, and a timing chart from the beginning of the shifting to the end.

In FIG. 27, the torque generated by motor 10 is downed before the shifting operation start time t0 at the time when the shifting demand is generated (shifting demand time t00). After the shifting is completed, and the torque generated by motor 10 is returned to the state before the shifting is started. The gear position command while shifting and the transfer torque command to assist mechanism 140, etc. are carried out in a similar way to that of FIG. 26.

The result comes to be shown in the timing chart of the bottom of FIG. 27. In a word, although the amount G_SHIFT0 of the acceleration change is produced from shifting demand time t00 to the shifting operation start time t0, the amount G_SHIFT1 of the acceleration change during the shifting from shifting operation start time t0 can be reduced as well as FIG. 26. For instance, the amount G_SHIFT0 of the former acceleration change is about 0.1 G, and the amount G_SHIFT1 of the latter acceleration change can be adjusted about 0.03 G–0.05 G as well as the case of FIG. 26.

The advantage of the control of FIG. 27 is that the amount G_SHIFT1 of the acceleration change between the shifting operation start time t0 and the shifting demand time t00 can be decreased by smoothly downing the generation torque of motor 10 between the shifting start time t0 and the shifting demand time t00. This has the effect that the amount G_SHIFT1 of the acceleration change during actual shifting operation (t0–t5) can be reduced without enlarging transfer torque of assist mechanism 140 by performing the shifting control of FIG. 27, that is, lowering the torque generated by motor 10 during actual shifting operation (t0–t5), and the shift quality without the sense of incompatibility as a whole can be achieved. To sum up, there is an effect that the transfer torque capacity of assist mechanism 140 can be lowered, the assist mechanism 140 can be miniaturized and made low-cost. Further, by lengthening the time interval between the shifting operation start time t0 and the shifting demand time t00 a little in case of the shift control like FIG. 27, it is possible to smooth the amount G_SHIFR0 of the change of the acceleration of the vehicle.

If the third control method or the fourth one is selected in step SS2, the processing advances to step SS3-2, and the torque down control of motor 10 is performed. After step SS3-2 is performed, the generation torque of motor 10 is judged in step SS4.

Figure 28:
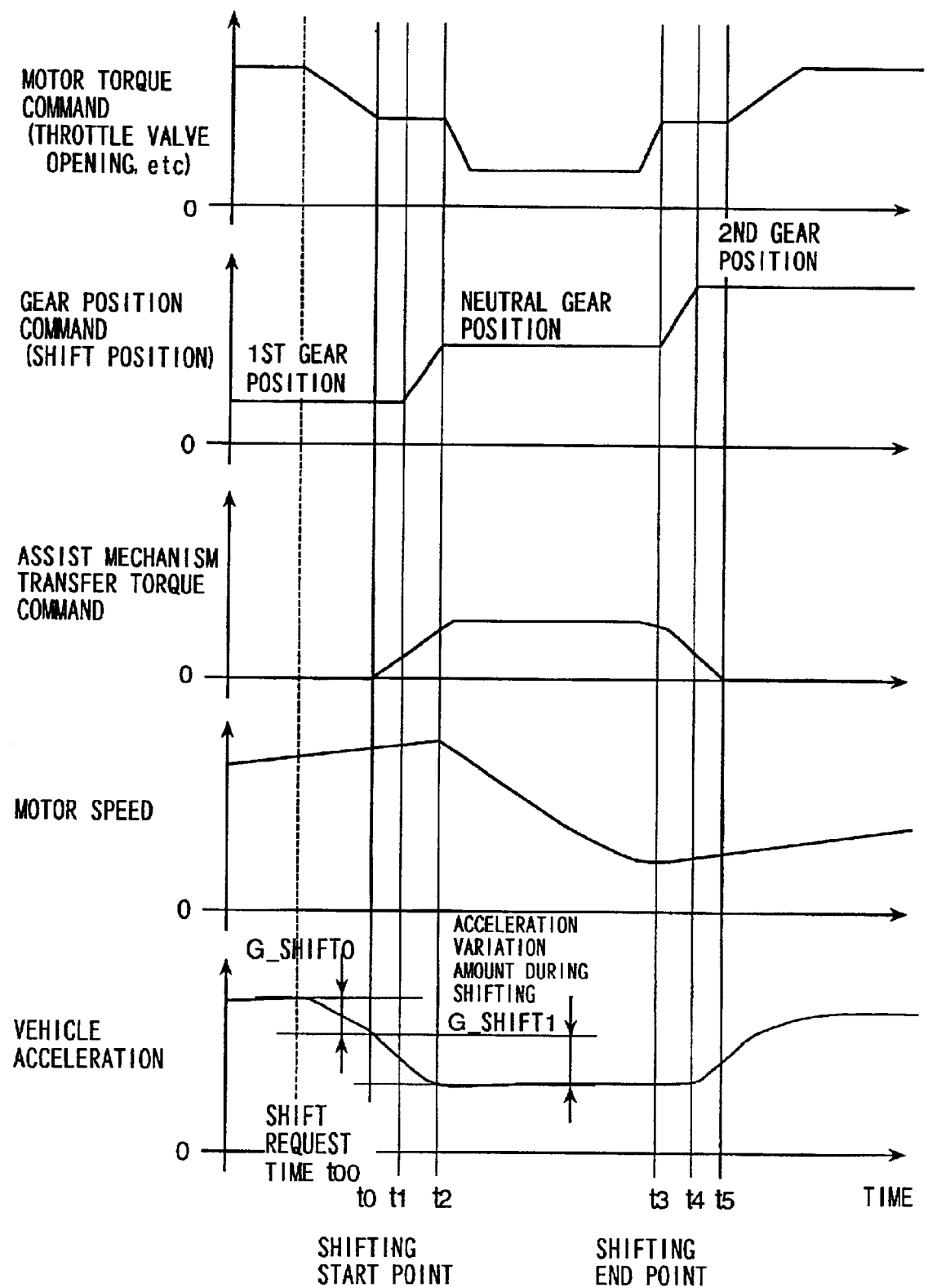
FIG. 28 is a timing chart showing further operation of the control system of the automatic transmission according to the first embodiment of the present invention and the acceleration of the vehicle which installs it.

If the torque generated by motor 10 is more than the predetermined value (for instance, 20 Nm or more, or 10% or more of the maximum generation torque of motor 10), the shift control with the torque assist which uses assist mechanism 140 of step SS5-3 is performed. Here, an example of the third shift control will be explained with reference to FIG. 28. FIG. 28 is a view similar to FIG. 26, and a timing chart from the beginning of the shifting to the end.

In FIG. 28, the generation torque of motor 10 is downed in the torque transfer section (t2–t3) only by assist mechanism 140 when the transmission is at a neutral position, from the shifting operation beginning t0 to the shifting operation end t5. In this case, the torque generated by motor 10 becomes small further. At this time, the transfer torque command of assist mechanism 140 becomes small as shown in the third graph from the top of FIG. 28, because assist mechanism 140 performs not only the torque transfer while shifting but also the rotation control of motor 10 while shifting, The acceleration of the vehicle in this case shows the characteristic like the lowest graph of FIG. 28. In a word, the amount G_SHIFT1 of the acceleration change is occurred from the shifting demand time t00 to the shifting operation start time t0. After then, the amount G_SHIFT0 of the change in the acceleration of the vehicle between the shifting operation start time t0 and the present shift time. In this case, the amount G_SHIFT0 of the acceleration change can be suppressed to about 0.1 G as well as the case of FIG. 27. Further, it is possible to decrease the sense of incompatibility to the driver by lengthening a little the time between the shifting operation start time t0 and the shifting demand time t00.

In addition, the amount G_SHIFT1 of the acceleration change from shifting operation beginning t0 to the present shifting time becomes about 0.1 G. In this case, the amount G_SHIFT1 of the acceleration change from shifting operation beginning t0 to the present shifting time is 0.1 G, and it becomes more than the case of FIG. 27. Therefore, the acceleration of the vehicle is secured (The acceleration of the vehicle while shifting is larger than 0), and the shifting is carried out with the acceleration feeling, because the torque can be transferred while shifting. Therefore, enough shift quality can be obtained.

Further, in this case,it is possible to reduce further the amount of transfer torque of assist mechanism 140 compared with the case of FIG. 27. Therefore, further low-cost and the miniaturization can be obtained. In a word, if the transferred torque capacity can be reduced when assist mechanism 140 is composed of the wet type multiple-disc clutch etc., it is becomes possible to reduce the size of the clutch. Further, the reduction of the pressure value by which the clutch disc is suppressed becomes possible. Therefore, there is an effect that it becomes possible to make hydraulic pumps, accumulators, etc. at low-cost when the wet type multiple-disc clutch is driven by using the hydraulic system.

Figure 29:
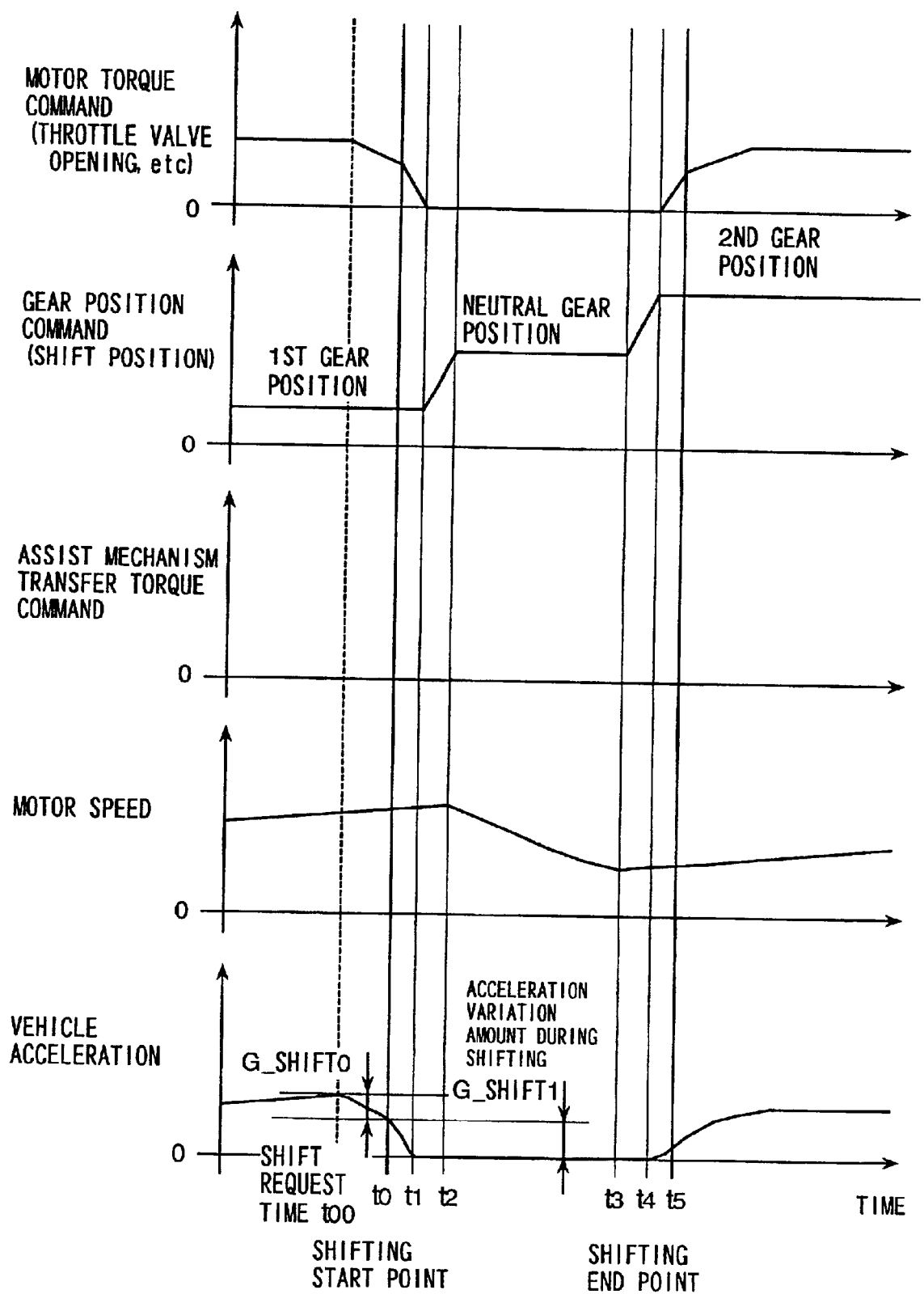
FIG. 29 is a timing chart showing further operation of the control system of the automatic transmission according to the first embodiment of the present invention and the acceleration of the vehicle which installs it.

If the torque generated by motor 10 is within the predetermined value (for instance, within 20 Nm, or within 10% of the maximum generation torque of motor 10), the shift control without the torque assist which does not use assist mechanism 140 of step SS5-4 is performed. Here, an example of the third shift control will be explained with reference to FIG. 28. When the torque where motor 10 is generated by judging step SS4 is a fixed value or less (within 10% of the maximum generation torque of 20 Nm or less or motor 10 for instance), shift control without the torque assist which does not use assist mechanism 140 of step SS5-4 is executed. Here, an example of the fourth shift control will be explained with reference to FIG. 29. FIG. 29 is a view similar to FIG. 26, and a timing chart from the beginning of the shifting to the end.

FIG. 29 shows an example in which the torque generated by motor 10 is small enough. If the opening of the accelerator is small in the gasoline engine for instance, the torque generated by the engine is within a small area. FIG. 29 shows the shifting operation in such a state. For instance, in a numerical example, it is when the opening of the accelerator pedal which demands the generation torque of motor 10 is within ⅛ of the full open, or when the throttle opening open is similarly within ⅛, etc.

The generation torque of motor 10 is a small enough in FIG. 29. Therefore, the shifting is performed here without the torque transfer by assist mechanism 140 while shifting. At this time, the transfer torque command to assist mechanism 140 is 0, and the torque command of motor 10 while shifting is 0.

As a result, the acceleration of the vehicle takes a value shown in the timing chart of the bottom of FIG. 29. In a word, because the torque generated by motor 10 before the shifting is very small as shown in the timing chart of the bottom of FIG. 29, the magnitude of the torque command down of motor 10 from the shifting demand time too to the shifting operation start time t0 also becomes small. Therefore, the amount G_SHIFT0 of the change in the acceleration generated here is very small, for example, about 0.05 G. Accordingly the operation of shifting can be started without giving the driver the sense of incompatibility.

Next, the torque of motor 10 is not transferred to transmission 400 by dropping the command torques of motor 10 up to 0 from shifting operation start time t0, and disengaging clutch 101 also which is the clutch for the start. At this time, because the transfer of the torque to transmission 400 is interrupted, the transfer torque while shifting becomes 0, and the acceleration of the vehicle becomes 0. Therefore, the amount G_SHIFT1 of the change in the acceleration of the vehicle is generated between the present shifting time and the shifting operation start time t0. However, even if the acceleration of the vehicle drops up to 0, the amount G_SHIFT1 of the change in the acceleration of the vehicle generated here becomes about 0.1 G, and does not give the driver the unpleasantness, because the acceleration of the vehicle at the shifting operation beginning time t0 becomes small enough (for instance, about 0.1 G).

Thus, when the torque generated by motor 10 is small, namely, when the driver does not demand the rapid acceleration, the driver can feel similar shift quality to FIG. 27 even if the torque is not transferred by assist mechanism 140 when shifting. In other words, the driver satisfies in riding comfort even if the torque generated by motor 10 is small and thus the torque is not transferred.

It is possible to provide a vehicle where riding comfort is satisfied enough by decreasing the use frequency of assist mechanism 140 by using the shift control which does not assist and the shift control which assists in the torque while shifting according to the torque generated by motor 10 properly. As a result, it is possible to obtain enough riding comfort, and excessively decrease the use frequency of assist mechanism 140. Therefore, there are effects that the deterioration of assist mechanism 140 can be suppressed, the liftime can be extended by decreasing the exchange frequency of assist mechanism 140.

Here, the torque judgment of motor 10 in step SS4 can be performed by using the torque control command of motor 10 besides the case that the torque generated by motor 10 is estimated. it is possible to determine by using the position of the accelerator pedal depressed by the driver or the opening of the throttle. For instance, the shift control without the torque assist which does not use assist mechanism 140 is performed when the accelerator pedal position is within ⅛ of full depressing position, and the shift control with the torque assist while shifting which uses assist mechanism 140 is performed when the accelerator pedal position is ⅛ or more of full depressing position. In addition, when the electronically controlled throttle which controls the generation torque of motor 10 is used, shift control without the torque assist which does not use assist mechanism 140 is performed if the throttle valve opening is within ⅛ of the full opening. Shift control with the torque assist while shifting which use assist mechanism 140 is executed if the throttle valve opening is ⅛ or more.

Finally, if shift control is executed in step SS5, the shifting is terminated and the shift control is completed in step SS6.

It is possible to switch the shift control in case that the same assist mechanisms 140 and the same transmission control units 602 are used. In a word, when the shifting performance is enough as explained in FIG. 28, shift control without the torque assist which does not use assist mechanism 140 in SS5-4 of FIG. 29 can be executed. In this case, the use frequency of assist mechanism 140 can be decreased. Therefore, there is an effect that the deterioration due to friction can be decreased when the wet typte multiple-disc clutch is used as assist mechanism 140. In addition, it is possible to decrease the load of assist mechanism 140 and maintain the amount of the change in the back and forth accelaration in the vehicle within the predetermined value by switching the shift control according to the accelerator pedal position and the throttle valve opening by which the intention of the driver is reflected. Therefore, the vehicle where the sense of incompatibility is not given when shifting can be achieved.

What is claimed is:

1. An automatic transmission comprising:
   a first axis for inputting power,
   a second axis for outputting a driving force source,
   at least one first gear group which consists of a drive gear fixed on said first axis, and a driven gear provided so as to engage or run idle with respect to said second axis while engaged with said drive gear,
   at least one second gear group which consists of a driven gear fixed on said second axis, and a drive gear provided so as to engage or run idle with respect to said first axis while engaged with said driven gear, and
   a torque transferring mechanism for transfering torque between said driven gear which can run idle with respect to said second axis and said driven gear fixed on said second axis.

2. An automatic transmission comprising:
   a first axis for inputting power,
   a second axis for outputting a driving force source,
   at least one first gear group which consists of a drive gear fixed on said first axis, and a driven gear provided so as to engage or run idle with respect to said second axis while engaged with said drive gear,
   at least one second gear group which consists of a driven gear fixed on said second axis, and a drive gear provided so as to engage or run idle with respect to said first axis while engaged with said driven gear, and
   a torque transferring mechanism for transferring torque between said driven gear of said first gear group which can run idle with respect to said second axis, and said driven gear of said second gear group which is fixed on said second axis,
   wherein the torque is transferred from said first axis to said second axis with said torque transferring mechanism.

3. An automatic transmission comprising:

a first axis for inputting power, a second axis for outputting a driving force source, at least one first gear group which consists of a drive gear fixed on said first axis, and a driven gear provided so as to engage or run idle with respect to said second axis while engaged with said drive gear, at least one second gear group which consists of a driven gear fixed on said second axis, and a drive gear provided so as to engage or run idle with respect to said first axis while engaged with said driven gear, wherein shifting is performed by switching a torque transferring mode from one mode, such that the torque is transferred from said first axis to said second axis with said first gear group or said second gear group, to the other mode, such that the torque is transferred from said first axis to said second axis with another first gear group different from said first gear group used in the former transferring mode or another second gear group different from said second gear group used in the former transferring mode, and a torque transferring mechanism for transferring torque provided between said driven gear of said first gear group which can run idle with respect to said second axis, and said driven gear of said second gear group which is fixed on said second axis, wherein the torque is transferred from said first axis to said second axis with said torque transferring mechanism while shifting.

4. An automatic transmission according to any one of claims 1, 2 and 3, wherein said torque transferring mechanism comprises:

a first gear engaged with said driven gear which can run idle with respect to said second axis, a second gear engaged with said driven gear fixed to said second axis, and a torque transferring means for transferring the torque between said first gear and said second gear.

5. A vehicle comprising:

an automatic transmission according to claim 4, a motor generator for generating the driving force source and regenerating the torque, and a transferring mechanism provided between wheels to which the torque of said transmission is not transferred and the motor generator, for transferring and interrupting the torque.

6. An automatic transmission according to claim 4, wherein the first gear engaged with said driven gear which can run idle with respect to said second axis, the second gear engaged with said driven gear fixed to said second axis, and the torque transferring means for transferring the torque between said first gear and said second gear in said torque transferring mechanism, are provided on another axis different from said first axis and said second axis.

7. A vehicle comprising:

an automatic transmission according to claim 6, a motor generator for generating the driving force source and regenerating the torque, and a transferring mechanism provided between wheels to which the torque of said transmission is not transferred and the motor generator, for transferring and interrupting the torque.

8. An automatic transmission according to claim 6, wherein a torque ratio transferred from said first axis to said second axis by said first gear group, said torque transferring mechanism and said second gear group is one or more.

9. A vehicle comprising:

an automatic transmission according to claim 8, a motor generator for generating the driving force source and regenerating the torque, and a transferring mechanism provided between wheels to which the torque of said transmission is not transferred and the motor generator, for transferring and interrupting the torque.

10. An automatic transmission according to claim 8, wherein another gear engaged with one of said drive gears fixed to said first axis is provided on another axis different from said first axis and said second axis, further comprising a motor generator for driving and regenerating, and a torque transferring mechanism for adjusting the torque transfer between said other gear and said motor generator.

11. An automatic transmission according to claim 10, wherein the driving force source of said motor generator is transferred to said second axis while shifting.

12. A vehicle comprising:

an automatic transmission according to claim 10, another motor generator for generating the driving force source and regenerating the torque, and a transferring mechanism provided between wheels to which the torque of said transmission is not transferred and the other motor generator, for transferring and interrupting the torque.

13. An automatic transmission according to claim 10, wherein a motor engaged with said transmission is started by said motor generator.

14. A vehicle comprising:

an automatic transmission according to claim 13, another motor generator for generating the driving force source and regenerating the torque, and a transferring mechanism provided between wheels to which the torque of said transmission is not transferred and the other motor generator, for transferring and interrupting the torque.

15. An automatic transmission according to claim 6, wherein another gear engaged with one of said drive gears fixed to said first axis is provided on another axis different from said first axis and said second axis, further comprising a motor generator for driving and regenerating, and a torque transferring mechanism for adjusting the torque transfer between said other gear and said motor generator.

16. An automatic transmission according to claim 15, wherein the driving force source of said motor generator is transferred to said second axis while shifting.

17. A vehicle comprising:

an automatic transmission according to claim 15, another motor generator for generating the driving force source and regenerating the torque, and a transferring mechanism provided between wheels to which the torque of said transmission is not transferred and the other motor generator, for transferring and interrupting the torque.

18. An automatic transmission according to claim 15, wherein a motor engaged with said transmission is started by said motor generator.

19. A vehicle comprising:

an automatic transmission according to claim 18, another motor generator for generating the driving force source and regenerating the torque, and a transferring mechanism provided between wheels to which the torque of said transmission is not transferred and the other motor generator, for transferring and interrupting the torque.

20. An automatic transmission according to claim 4, wherein a torque ratio transferred from said first axis to said second axis by said first gear group, said torque transferring mechanism and said second gear group is one or more.

21. A vehicle comprising:

an automatic transmission according to claim 20, a motor generator for generating the driving force source and regenerating the torque, and a transferring mechanism provided between wheels to which the torque of said transmission is not transferred and the motor generator, for transferring and interrupting the torque.

22. An automatic transmission according to claim 20, wherein another gear engaged with one of said drive gears fixed to said first axis is provided on another axis different from said first axis and said second axis, further comprising a motor generator for driving and regenerating, and a torque transferring mechanism for adjusting the torque transfer between said other gear and said motor generator.

23. An automatic transmission according to claim 22, wherein the driving force source of said motor generator is transferred to said second axis while shifting.

24. A vehicle comprising:

an automatic transmission according to claim 22, another motor generator for generating the driving force source and regenerating the torque, and a transferring mechanism provided between wheels to which the torque of said transmission is not transferred and the other motor generator, for transferring and interrupting the torque.

25. An automatic transmission according to claim 22, wherein a motor engaged with said transmission is started by said motor generator.

26. A vehicle comprising:

an automatic transmission according to claim 25, another motor generator for generating the driving force source and regenerating the torque, and a transferring mechanism provided between wheels to which the torque of said transmission is not transferred and the other motor generator, for transferring and interrupting the torque.

27. An automatic transmission according to claim 4, wherein another gear engaged with one of said drive gears fixed to said first axis is provided on another axis different from said first axis and said second axis, further comprising a motor generator for driving and regenerating, and a torque transferring mechanism for adjusting the torque transfer between said other gear and said motor generator.

28. An automatic transmission according to claim 27, wherein the driving force source of said motor generator is transferred to said second axis while shifting.

29. A vehicle comprising:

an automatic transmission according to claim 27, another motor generator for generating the driving force source and regenerating the torque, and a transferring mechanism provided between wheels to which the torque of said transmission is not transferred and the other motor generator, for transferring and interrupting the torque.

30. An automatic transmission according to claim 27, wherein a motor engaged with said transmission is started by said motor generator.

31. A vehicle comprising:

an automatic transmission according to claim 30, another motor generator for generating the driving force source and regenerating the torque, and a transferring mechanism provided between wheels to which the torque of said transmission is not transferred and the other motor generator, for transferring and interrupting the torque.

32. An automatic transmission according to any one of claims 1 to 3, wherein a torque ratio transferred from said first axis to said second axis by said first gear group, said torque transferring mechanism and said second gear group is one or more.

33. A vehicle comprising:

an automatic transmission according to claim 32, a motor generator for generating the driving force source and regenerating the torque, and a transferring mechanism provided between wheels to which the torque of said transmission is not transferred and the motor generator, for transferring and interrupting the torque.

34. An automatic transmission according to claim 32, wherein another gear engaged with one of said drive gears fixed to said first axis is provided on another axis different from said first axis and said second axis, further comprising a motor generator for driving and regenerating, and a torque transferring mechanism for adjusting the torque transfer between said other gear and said motor generator.

35. An automatic transmission according to claim 34, wherein the driving force source of said motor generator is transferred to said second axis while shifting.

36. A vehicle comprising:

an automatic transmission according to claim 34, another motor generator for generating the driving force source and regenerating the torque, and a transferring mechanism provided between wheels to which the torque of said transmission is not transferred and the other motor generator, for transferring and interrupting the torque.

37. An automatic transmission according to claim 27, wherein a motor engaged with said transmission is started by said motor generator.

38. A vehicle comprising:

an automatic transmission according to claim 37, another motor generator for generating the driving force source and regenerating the torque, and a transferring mechanism provided between wheels to which the torque of said transmission is not transferred and the other motor generator, for transferring and interrupting the torque.

39. An automatic transmission according to any one of claims 1 to 3, wherein another gear engaged with one of said drive gears fixed to said first axis is provided on another axis different from said first axis and said second axis, further comprising a motor generator for driving and regenerating, and a torque transferring mechanism for adjusting the torque transfer between said other gear and said motor generator.

40. An automatic transmission according to claim 39, wherein the driving force source of said motor generator is transferred to said second axis while shifting.

41. A vehicle comprising:
an automatic transmission according to claim 39,
another motor generator for generating the driving force source and regenerating the torque, and
a transferring mechanism provided between wheels to which the torque of said transmission is not transferred and the other motor generator, for transferring and interrupting the torque.

42. An automatic transmission according to claim 29, wherein a motor engaged with said transmission is started by said motor generator.

43. A vehicle comprising:
an automatic transmission according to claim 42,
another motor generator for generating the driving force source and regenerating the torque, and
a transferring mechanism provided between wheels to which the torque of said transmission is not transferred and the other motor generator, for transferring and interrupting the torque.

44. An automatic transmission according to any one of claims 1, 2 and 3, wherein said torque transferring mechanism comprises a friction type clutch.

45. A vehicle comprising:
an automatic transmission according to claim 44,
a motor generator for generating the driving force source and regenerating the torque, and
a transferring mechanism provided between wheels to which the torque of said transmission is not transferred and the motor generator, for transferring and interrupting the torque.

46. An automatic transmission according to claim 44, wherein a lubricant for said friction clutch is provided independently of a lubricant for said transmission.

47. A vehicle comprising:
an automatic transmission according to claim 46,
a motor generator for generating the driving force source and regenerating the torque, and
a transferring mechanism provided between wheels to which the torque of said transmission is not transferred and the motor generator, for transferring and interrupting the torque.

48. A vehicle comprising:
an automatic transmission according to any one of claims 1 to 3,
a motor generator for generating the driving force source and regenerating the torque, and
a transferring mechanism provided between wheels to which the torque of said transmission is not transferred and the motor generator, for transferring and interrupting the torque.

49. A vehicle according to claim 48, wherein the torque generated by said motor generator is transferred to said wheels by said transferring mechanism while shifting, and the torque is added to said wheels.

50. An automatic transmission comprising:
a first axis for inputting power,
a second axis for outputting a driving force source,
at least one first gear group which consists of a drive gear fixed on said first axis, and a driven gear provided so as to engage or run idle with respect to said second axis while engaged with said drive gear,
at least one second gear group which consists of a driven gear fixed on said second axis, and a drive gear provided so as to engage or run idle with respect to said first axis while engaged with said driven gear,
a torque transferring mechanism for transferring torque between said driven gear which can run idle with respect to said second axis and said driven gear fixed on said second axis,
wherein when said driven gear of said first gear group runs idle, the torque is transferred from said first axis to said second axis through a driven gear which runs idle with respect to said drive gear of said first gear group, said torque transferring mechanism, and a driven gear of said second gear group, and when said driven gear of said first gear group is engaged to the second axis, the torque is transferred from said first axis to said second axis through the driven gear engaged to said drive gear of said first gear group.

51. A vehicle which includes an automatic transmission comprising:
a first axis for inputting power,
a second axis for outputting a driving force source,
at least one first gear group which consists of a drive gear fixed on said first axis, and a driven gear provided so as to engage or run idle with respect to said second axis while engaged with said drive gear,
at least one second gear group which consists of a driven gear fixed on said second axis, and a drive gear provided so as to engage or run idle with respect to said first axis while engaged with said driven gear,
wherein the shifting is done by switching from torque transfer from said first axis to said second axis by said first gear group or said second gear group to torque transfer from said first axis to said second axis by at least one other first gear group or at least one other second gear group different from said at least one first gear group or said at least one second gear group, and
a torque transferring mechanism provided between one of said first gear groups and one of said second gear groups in said transmission, and a shifting control means for transferring torque from said first axis to said second axis by said torque transferring mechanism while shifting,
wherein an amount of back and forth acceleration change generated in said vehicle while shifting is controlled by said shifting control means so as to fall within $1.0$ m/s$^2$.

52. A vehicle according to claim 51, wherein the back and forth accelaration generated in said vehicle while shifting is controlled by said shift control means so as to become more than $0.0$ m/s$^2$.

53. A vehicle which includes an automatic transmission comprising:
a first axis for inputting power,
a second axis for outputting a driving force source,
at least one first gear group which consists of a drive gear fixed on said first axis, and a driven gear provided so as to engage or run idle with respect to said second axis while engaged with said drive gear,
at least one or more second gear group which consists of a driven gear fixed on said second axis, and a drive gear provided so as to engage or run idle with respect to said first axis while engaged with said driven gear,
wherein shifting is done by switching from torque transfer from said first axis to said second axis by said first gear group or said second gear group to torque transfer from said first axis to said second axis by at least one other first gear group or at least one other second gear group different from said at least one first gear group or said at least one second gear group, and a torque transferring mechanism provided between one of said first gear groups and one of said second gear groups in said transmission, and a control means for controlling the shifting by selecting a shifting system in which torque transfer from said first axis to said second axis is performed by said torque transferring mechanism while shifting or a shifting system in which said torque transferring mechanism is not used, wherein an amount of back and forth accelaration change generated in said vehicle while shifting is controlled by said control means so as to fall within 1.0 m/s$^2$.

54. A vehicle according to claim 53, further comprising a motor which generates power introduced into said first axis, wherein the torque is transferred from said first axis to said second axis by said torque transferring mechanism while shifting when the torque generated by said motor is more than a fixed value, and otherwise, the torque is not transferred from said first axis to said second axis by said torque transferring mechanism while shifting.

55. A vehicle according to claim 53, further comprising a motor which generates power introduced into said first axis, wherein the torque is transferred from said first axis to said second axis by said torque transferring mechanism while shifting when a throttle valve opening for adjusting the torque generated by said motor is more than a fixed value, and otherwise, the torque is not transferred from said first axis to said second axis by said torque transferring mechanism while shifting.

56. An automatic transmission comprising:

a first axis for inputting power;

a second axis for outputting a driving force source;

at least one first gear group which consists of a drive gear fixed on said first axis, and a driven gear provided so as to engage or run idle with respect to said second axis while engaged with said drive gear;

at least one second gear group which contains a driven gear fixed on said second axis, and a torque transferring mechanism for transferring torque between said driven gear which can run idle with respect to said second axis and said driven gear fixed to said second axis.

57. An automatic transmission comprising:

a first axis for inputting power;

a second axis for outputting a driving force source;

at least one first gear group which consists of a drive gear fixed on said first axis, and a driven gear provided so as to engage or run idle with respect to said second axis while engaged with said drive gear;

at least one second gear group which contains a driven gear fixed on said second axis; and a torque transferring mechanism for transferring torque between said driven gear of said first gear group which can run idle with respect to said second axis, and said driven gear of said second gear group which is fixed on said second axis;

wherein torque is transferred from said first axis to said second axis with said torque transferring mechanism.

58. An automatic transmission comprising:

a first axis for inputting power;

a second axis for outputting a driving force source;

at least one first gear group which consists of a drive gear fixed on said first axis, and a driven gear provided so as to engage or run idle with respect to said second axis while engaged with said drive gear;

at least one second gear group which contains a driven gear fixed on said second axis;

wherein shifting is performed by switching a torque transferring mode from one mode, such that the torque is transferred from said first axis to said second axis with said first gear group or said second gear group, to the other mode, such that the torque is transferred from said first axis to said second axis with another first gear group different from said first gear group used in the former transferring mode or another second gear group different from said second gear group used in the former transferring mode; and a torque transferring mechanism for transferring torque provided between said driven gear of said first gear group which can run idle with respect to said second axis and said driven gear of said second gear group which is fixed on said second axis, wherein torque is transferred from said first axis to said second axis with said torque transferring mechanism while shifting.

* * * * *